(12) United States Patent
Taherzadeh Boroujeni et al.

(10) Patent No.: US 12,238,780 B2
(45) Date of Patent: *Feb. 25, 2025

(54) RANDOM ACCESS CHANNEL MESSAGE WITHOUT A PHYSICAL DOWNLINK CONTROL CHANNEL

(71) Applicant: QUALCOMM Incorporated, San Diego, CA (US)

(72) Inventors: Mahmoud Taherzadeh Boroujeni, San Diego, CA (US); Iyab Issam Sakhnini, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/340,347

(22) Filed: Jun. 23, 2023

(65) Prior Publication Data

US 2023/0337291 A1    Oct. 19, 2023

Related U.S. Application Data

(63) Continuation of application No. 17/181,981, filed on Feb. 22, 2021, now Pat. No. 11,729,832.

(60) Provisional application No. 62/980,670, filed on Feb. 24, 2020.

(51) Int. Cl.
*H04W 74/0833* (2024.01)

(52) U.S. Cl.
CPC ............................. *H04W 74/0833* (2013.01)

(58) Field of Classification Search
None
See application file for complete search history.

(56) References Cited

U.S. PATENT DOCUMENTS

| | | | |
|---|---|---|---|
| 10,904,910 B2 * | 1/2021 | Chen | H04W 48/12 |
| 11,395,338 B2 * | 7/2022 | Ng | H04W 72/0453 |
| 11,405,094 B2 * | 8/2022 | Khoshnevisan | H04W 80/02 |

(Continued)

FOREIGN PATENT DOCUMENTS

WO    2020032745 A1    2/2020

OTHER PUBLICATIONS

3GPP: "3rd Generation Partnership Project, Technical Specification Group Radio Access Network, NR, Medium Access Control, Protocol Specification (Release 15)", TS 38.321, V15.8.0 (Dec. 2019), 3GPP Standard, Technical Specification, Mobile Competence Centre, 650, Route Des Lucioles, F-06921 Sophia-Antipolis Cedex, France, vol. RAN WG2, No. V15.8.0 , Jan. 7, 2020, 78 Pages, XP051860530, Section 1, 5.1, 5.4.1, 6.1.3.9.

(Continued)

*Primary Examiner* — Faiyazkhan Ghafoerkhan
(74) *Attorney, Agent, or Firm* — Harrity & Harrity LLP/QUALCOMM Incorporated

(57) ABSTRACT

Various aspects of the present disclosure generally relate to wireless communication. In some aspects, a user equipment (UE) may transmit a first random access channel (RACH) message to a base station, and monitor for a second RACH message from the base station in a set of resource candidates that are based at least in part on the transmitted first RACH message absent downlink control information. The set of resource candidates may be outside of a physical downlink control channel. Numerous other aspects are provided.

32 Claims, 14 Drawing Sheets

(56) References Cited

U.S. PATENT DOCUMENTS

| | | | |
|---|---|---|---|
| 11,729,832 B2* | 8/2023 | Taherzadeh Boroujeni | H04W 74/0833 370/329 |
| 2010/0157927 A1* | 6/2010 | Mochizuki | H04L 1/0038 455/450 |
| 2015/0215920 A1* | 7/2015 | Mochizuki | H04L 27/0006 370/329 |
| 2016/0192420 A1* | 6/2016 | Kim | H04W 4/06 370/329 |
| 2016/0295609 A1* | 10/2016 | Vajapeyam | H04W 74/0833 |
| 2016/0374068 A1* | 12/2016 | Kim | H04W 4/06 |
| 2019/0021119 A1* | 1/2019 | Ng | H04W 72/0453 |
| 2019/0110314 A1* | 4/2019 | Abedini | H04W 52/0212 |
| 2019/0166529 A1* | 5/2019 | Chen | H04W 74/006 |
| 2019/0320455 A1* | 10/2019 | Chen | H04L 5/001 |
| 2020/0045745 A1* | 2/2020 | Cirik | H04W 72/23 |
| 2020/0052769 A1* | 2/2020 | Cirik | H04L 5/0094 |
| 2020/0100154 A1* | 3/2020 | Cirik | H04B 7/0695 |
| 2020/0100311 A1* | 3/2020 | Cirik | H04W 72/23 |
| 2020/0137821 A1* | 4/2020 | Cirik | H04W 76/19 |
| 2020/0145280 A1* | 5/2020 | Cirik | H04W 72/21 |
| 2020/0221505 A1* | 7/2020 | Agiwal | H04W 74/0833 |
| 2020/0322948 A1* | 10/2020 | Xue | H04W 52/365 |
| 2020/0383119 A1* | 12/2020 | Sun | G16Y 10/75 |
| 2021/0112580 A1* | 4/2021 | Chen | H04L 5/001 |
| 2021/0219255 A1* | 7/2021 | Zhang | H04W 74/0833 |
| 2021/0226688 A1* | 7/2021 | Khoshnevisan | H04L 5/0092 |
| 2021/0227464 A1* | 7/2021 | Kung | H04W 52/0229 |
| 2021/0227465 A1* | 7/2021 | Kung | H04W 52/0216 |
| 2021/0266977 A1* | 8/2021 | Taherzadeh Boroujeni | H04W 74/0833 |
| 2021/0360510 A1* | 11/2021 | Zheng | H04L 5/0012 |
| 2023/0337291 A1* | 10/2023 | Taherzadeh Boroujeni | H04W 74/0833 |

OTHER PUBLICATIONS

Co-pending U.S. Appl. No. 17/181,897, inventor Taherzadeh Boroujeni; Mahmoud, filed Feb. 22, 2021.
International Preliminary Report on Patentability—PCT/US2021/070179, The International Bureau of WIPO—Geneva, Switzerland, Sep. 9, 2022.
International Search Report and Written Opinion—PCT/US2021/070179—ISA/EPO—Jun. 11, 2021.
Mediatek Inc: "Discussion on PRACH and RACH Procedure in Coverage Enhancement Mode", 3GPP TSG-RAN WG1 #75, 3GPP Draft, R1-135424 Discussion on PRACH and RACH Procedure in Coverage Enhancement Mode_F, 3rd Generation Partnership Project (3GPP), Mobile Competence Centre, 650, Route Des Lucioles, F-06921 Sop, vol. RAN WG1, No. San Francisco, USA, Nov. 11, 2013-Nov. 15, 2013, 5 Pages, Nov. 13, 2013 (Nov. 13, 2013), XP050735102, Nov. 2, 2013, the whole document.
Mediatek Inc: "On the Need of PDCCH for SIB and Other Common Channels", 3GPP Draft, 3GPP TSG-RAN WG1 #75, R1-135422 On the Need of PDCCH For SIB and Other Common Channels_F, 3rd Generation Partnership Project (3GPP), Mobile Competence Centre, 650, Route Des Lucioles, F-06921 Sophia-Antipolis, vol. RAN WG1, No. San Francisco, USA, Nov. 11, 2013-Nov. 15, 2013, Nov. 2, 2013 (Nov. 2, 2013), 6 Pages, Nov. 13, 2013 (Nov. 13, 203), XP050735100, the whole document.
Mediatek Inc: "RAR for Rel-13 MTC UE in Normal and Coverage Extension", 3GPP TSG RAN WG1 Meeting #80, R1-150676, Feb. 18, 2015, Athens, Greece, Feb. 9, 2015-Feb. 13, 2015, 3 Pages.

* cited by examiner

RANDOM ACCESS CHANNEL MESSAGE WITHOUT A PHYSICAL DOWNLINK CONTROL CHANNEL

CROSS-REFERENCE TO RELATED APPLICATION

This application is a continuation of U.S. patent application Ser. No. 17/181,981, filed on Feb. 22, 2021, entitled "RANDOM ACCESS CHANNEL MESSAGE WITHOUT A PHYSICAL DOWNLINK CONTROL CHANNEL," which claims priority to U.S. Provisional Patent Application No. 62/980,670, filed on Feb. 24, 2020, entitled "RANDOM ACCESS CHANNEL MESSAGE WITHOUT A PHYSICAL DOWNLINK CONTROL CHANNEL," the contents of which are incorporated herein by reference in their entireties.

INTRODUCTION

Aspects of the present disclosure generally relate to wireless communication and to techniques and apparatuses for random access channel (RACH) communications.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include transmitting a first random access channel (RACH) message to a base station, and monitoring for a second RACH message from the base station in a set of resource candidates that are outside of a physical downlink control channel (PDCCH) based at least in part on the transmitted first RACH message.

In some aspects, a method of wireless communication, performed by a UE, may include transmitting a first RACH message to a base station, and monitoring for a second RACH message from the base station in a set of resource candidates that are based at least in part on the transmitted first RACH message absent downlink control information.

In some aspects, a method of wireless communication, performed by a base station, may include receiving a first RACH message from a UE, and transmitting a second RACH message in a set of resource candidates that are outside of a PDCCH based at least in part on receiving the first RACH message.

In some aspects, a UE for wireless communication may include a memory and one or more processors coupled to the memory. The memory and the one or more processors may be configured to transmit a first RACH message to a base station, and monitor for a second RACH message from the base station in a set of resource candidates that are outside of a PDCCH based at least in part on the transmitted first RACH message.

In some aspects, a UE for wireless communication may include a memory and one or more processors coupled to the memory. The memory and the one or more processors may be configured to transmit a first RACH message to a base station, and monitor for a second RACH message from the base station in a set of resource candidates that are based at least in part on the transmitted first RACH message absent downlink control information.

In some aspects, a base station for wireless communication may include a memory and one or more processors coupled to the memory. The memory and the one or more processors may be configured to receive a RACH message from a UE, and transmit a second RACH message in a set of resource candidates that are outside of a PDCCH based at least in part on receiving the first RACH message.

In some aspects, a non-transitory computer-readable medium may store one or more instructions for wireless communication. The one or more instructions, when executed by one or more processors of a UE, may cause the one or more processors to transmit a first RACH message to a base station, and monitor for a second RACH message from the base station in a set of resource candidates that are outside of a PDCCH based at least in part on the transmitted first RACH message.

In some aspects, a non-transitory computer-readable medium may store one or more instructions for wireless communication. The one or more instructions, when executed by one or more processors of a UE, may cause the one or more processors to transmit a first RACH message to a base station, and monitor for a second RACH message from the base station in a set of resource candidates that are based at least in part on the transmitted first RACH message absent downlink control information.

In some aspects, a non-transitory computer-readable medium may store one or more instructions for wireless communication. The one or more instructions, when executed by one or more processors of a base station, may cause the one or more processors to receive a first RACH message from a UE, and transmit a second RACH message in a set of resource candidates that are outside of a PDCCH based at least in part on receiving the first RACH message.

In some aspects, an apparatus for wireless communication may include means for transmitting a first RACH message to a base station, and means for monitoring for a second RACH message from the base station in a set of resource candidates that are outside of a PDCCH based at least in part on the transmitted first RACH message.

In some aspects, an apparatus for wireless communication may include means for transmitting a first RACH message to a base station, and means for monitoring for a second RACH message from the base station in a set of resource candidates that are based at least in part on the transmitted first RACH message absent downlink control information.

In some aspects, an apparatus for wireless communication may include means for receiving a first RACH message from a UE, and means for transmitting a second RACH message in a set of resource candidates that are outside of a PDCCH based at least in part on receiving the first RACH message.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
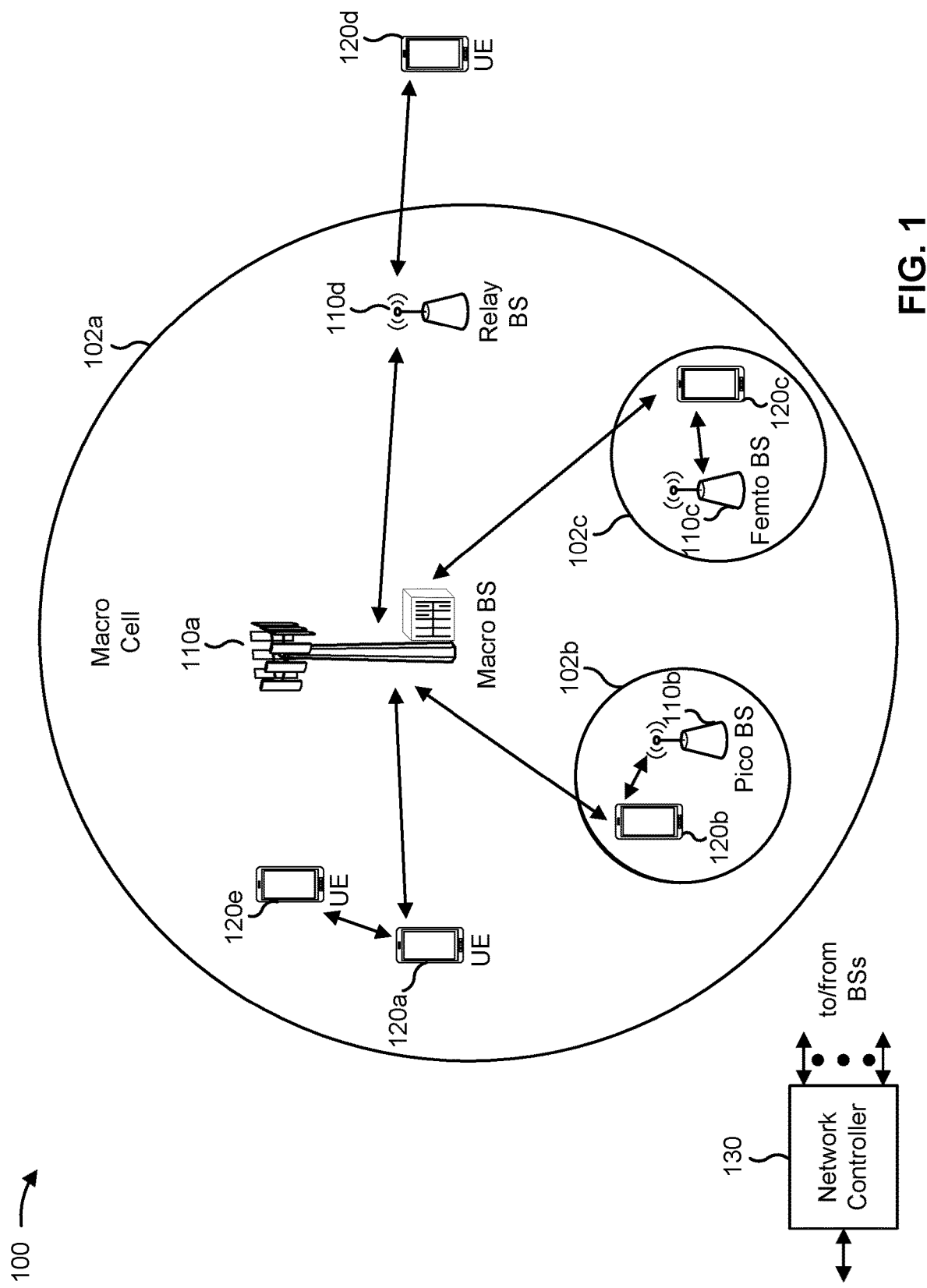
FIG. 1 is a block diagram conceptually illustrating an example of a wireless communication network, in accordance with various aspects of the present disclosure.

A user equipment (UE) may transmit a random access channel (RACH) message to a base station as part of a RACH procedure to initiate communication. The base station may respond with a second RACH message (e.g., msg2, msgB) that includes control information on a physical downlink control channel (PDCCH). However, if UE coverage is poor for certain frequencies (e.g., millimeter Wave 5G) or if a signal for the first RACH message is weak, the base station may be limited in how to boost transmission of the second RACH message to improve coverage. The PDCCH may present a power bottleneck for RACH messages. In one or more examples, the base station is only able to use two or three symbols in the PDCCH because the PDCCH is limited to a core set of resources (CORESET) and thus transmit power increases are limited to the two or three symbols.

To increase coverage and to improve reception of the second RACH message, the UE may monitor for the second RACH message in time and frequency resources that are not limited to the two or three symbols in the PDCCH. Receiving the second RACH message across a greater number of symbols (e.g., more than three symbols) improves reception of the RACH message. According to various aspects described herein, the UE may monitor for and receive the second RACH message in time and frequency resources outside the PDCCH, or resources that are an alternative to resources that include the PDCCH (resources in downlink control information (DCI) in the PDCCH). The resources for the UE to monitor for the second RACH message may be based at least in part on the transmission of the first RACH message absent DCI. That is, the resources for the second message are based at least in part on the first RACH message, DCI is not used to schedule the second RACH message, and the second RACH message is not received in DCI. This provides for improved coverage for the second RACH message, because the UE may receive more symbols for the second RACH message when DCI is not used.

In a RACH procedure, data for the second RACH message on a physical downlink shared channel (PDSCH) is scheduled by DCI carried in the PDCCH. Instead of scheduling the data on the PDSCH via the PDCCH, the base station may schedule the PDSCH via system information, such as in remaining minimum system information (RMSI). In other words, the UE may monitor for the second RACH message in resources that are not scheduled via DCI (e.g., resources in the PDSCH). In some aspects, the second RACH message may be scheduled via a remaining minimum system information (RMSI) message or other system information.

Resources that are not scheduled via DCI may include resources in a downlink (DL) data portion of a DL-centric slot. The DL data portion may sometimes be referred to as the payload of the DL-centric slot. The DL data portion may include the communication resources utilized to communicate DL data from a scheduling entity (e.g., UE or BS) to a subordinate entity (e.g., UE). In some examples, the DL data portion may be a PDSCH. The data portion may be considered to be outside the PDCCH. If a UE is to receive a RACH message outside of the PDCCH, in which DCI is absent, the UE may monitor for the RACH message in a set of resource candidates (e.g., symbols, subcarriers) that are located in the data portion, such as in a PDSCH rather than in the PDCCH of the control portion. For example, the UE may monitor for the RACH message in a set of resource candidates, which includes more symbols than the two or three symbols that are available for the RACH message in the control portion. The set of resource candidates may also be scheduled absent DCI, or scheduled by signaling that is not in DCI.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network, a 5G or NR network, and/or the like. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In some aspects, UE 120 may perform scheduling operations, resource selection operations, and/or other operations described elsewhere herein as being performed by the base station 110.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" (mmWave) band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

As shown in FIG. 1, the UE 120 may include a communication manager 140. As described in more detail elsewhere herein, the communication manager 140 may transmit a first RACH message to a base station and monitor for a second RACH message from the base station in a set of resource candidates that are outside of a PDCCH based at least in part on the transmitted first RACH message. Additionally, or alternatively, the communication manager 140 may perform one or more other operations described herein.

Similarly, the base station 110 may include a communication manager 150. As described in more detail elsewhere herein, the communication manager 150 may receive a first RACH message from a UE and transmit a second RACH message in a set of resource candidates that are outside of a PDCCH based at least in part on receiving the first RACH message. Additionally, or alternatively, the communication manager 150 may perform one or more other operations described herein.

As indicated above, FIG. 1 is provided merely as an example. Other examples may differ from what is described with regard to FIG. 1.

Figure 2:
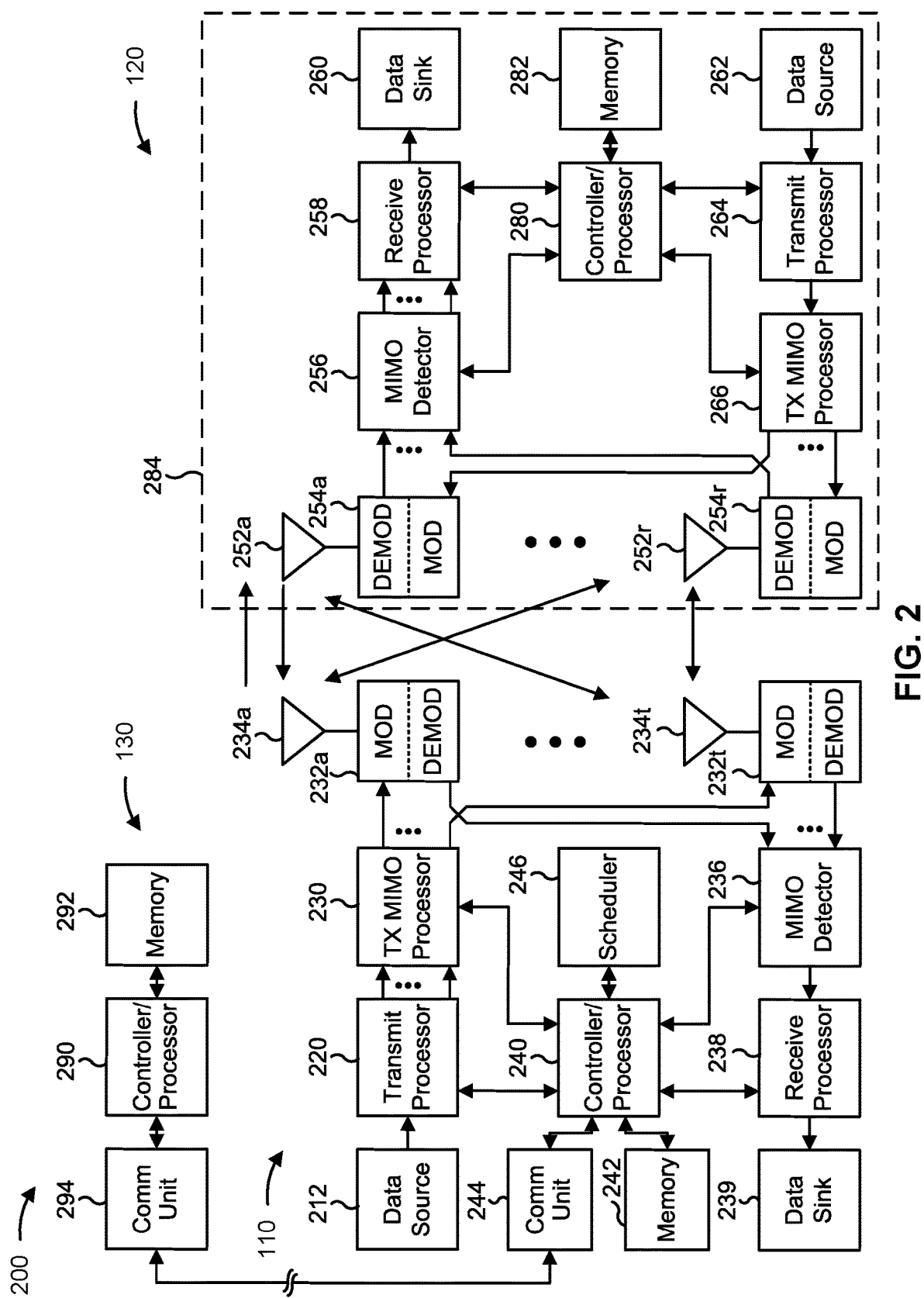
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, wherein general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a RACH message without a PDCCH, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for transmitting a first RACH message to a base station, means for monitoring for a second RACH message from the base station in a set of resource candidates that are outside of a PDCCH based at least in part on the transmitted first RACH message, means for monitoring for a second RACH message from the base station in a set of resource candidates that are based at least in part on the transmitted first RACH message absent downlink control information, and/or the like. Additionally, or alternatively, UE 120 may include means for performing one or more other operations described herein. In some aspects, such means may include communication manager 140. Additionally, or alternatively, such means may include one or more components of UE 120 described in connection with FIG. 2.

In some aspects, base station 110 may include means for receiving a first RACH message from a UE, means for transmitting a second RACH message in a set of resource candidates that are outside of a PDCCH based at least in part on receiving the first RACH message, and/or the like. Additionally, or alternatively, base station 110 may include means for performing one or more other operations described herein. In some aspects, such means may include the communication manager 150. In some aspects, such means may include one or more components of base station 110 described in connection with FIG. 2.

As indicated above, FIG. 2 is provided merely as an example. Other examples may differ from what is described with regard to FIG. 2.

Figure 3:
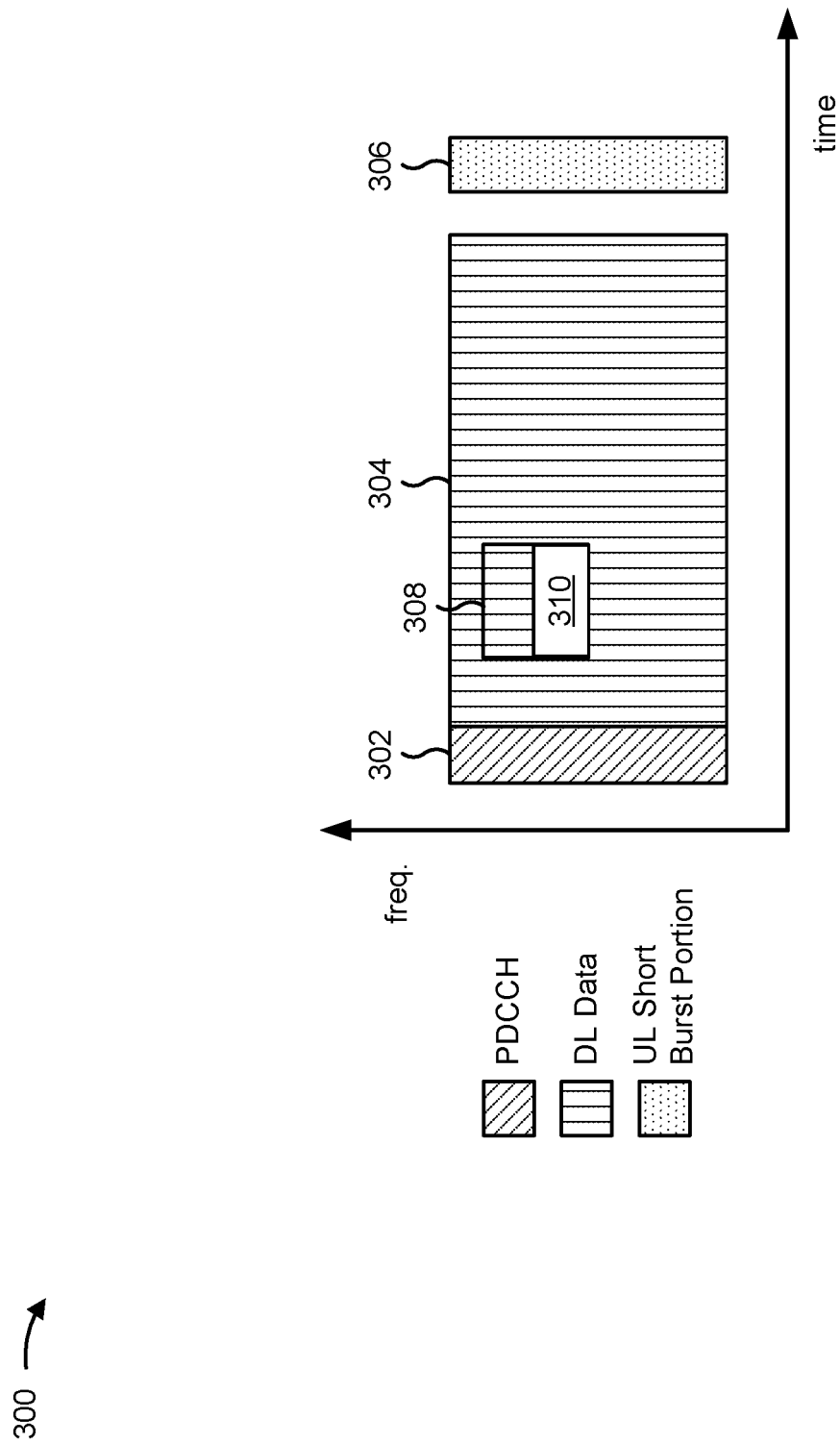
FIG. 3 is a diagram showing an example of a downlink-centric slot or wireless communication structure, in accordance with various aspects of the present disclosure.

FIG. 3 is a diagram 300 showing an example of a downlink (DL)-centric slot or wireless communication structure, in accordance with various aspects of the present disclosure. The DL-centric slot may include a control portion 302. Control portion 302 may exist in the initial or beginning portion of the DL-centric slot. Control portion 302 may include various scheduling information and/or control information corresponding to various portions of the DL-centric slot. In some configurations, control portion 302 may be a PDCCH, as indicated in FIG. 3. In some aspects, control portion 302 may include legacy PDCCH information, shortened PDCCH (sPDCCH) information, a control format indicator (CFI) value (e.g., carried on a physical control format indicator channel (PCFICH)), one or more grants (e.g., downlink grants, uplink grants), and/or the like. Downlink control information (DCI) may be received in the PDCCH. A control resource set (CORESET) may also be limited to the PDCCH.

A UE may use a RACH procedure to synchronize with a base station and to establish a radio resource control (RRC) connection to the base station. This may give the UE the capability to transmit data to and receive data from the base station. To start the RACH procedure, the UE may transmit a first RACH message to the base station to initiate communication with the base station. The base station may, in response, transmit a second RACH message to the UE in DCI, which would be in the PDCCH, shown by control portion 302 of FIG. 3.

The DL-centric slot may also include a DL data portion 304. The DL data portion 304 may sometimes be referred to as the payload of the DL-centric slot. The DL data portion 304 may include the communication resources utilized to communicate DL data from the scheduling entity (e.g., UE or BS) to the subordinate entity (e.g., UE). In some configurations, the DL data portion 304 may be a PDSCH. Data portion 304 may be considered to be outside the PDCCH. If a UE is to receive a RACH message outside of the PDCCH, in which DCI is absent, the UE may monitor for the RACH message in a set of resource candidates (e.g., symbols, subcarriers) that are located in data portion 304, such as in a physical downlink shared channel (PDSCH), rather than in the PDCCH of control portion 302. For example, the UE may monitor for second RACH message 310 in a set of resource candidates 308, which includes more symbols than the two or three symbols that are available for the second RACH message in control portion 302. The set of resource candidates 308 may also be scheduled absent DCI, or scheduled by signaling that is not in DCI.

The DL-centric slot may also include an uplink (UL) short burst portion 306. UL short burst portion 306 may sometimes be referred to as an UL burst, an UL burst portion, a common UL burst, a short burst, an UL short burst, a common UL short burst, a common UL short burst portion, and/or various other suitable terms. In some aspects, UL short burst portion 306 may include one or more reference signals. Additionally, or alternatively, UL short burst portion 306 may include feedback information corresponding to various other portions of the DL-centric slot. For example, UL short burst portion 306 may include feedback information corresponding to control portion 302 and/or data portion 304. Non-limiting examples of information that may be included in UL short burst portion 306 include an acknowledgement (ACK) signal (e.g., a physical uplink control channel (PUCCH) ACK, a physical uplink shared channel (PUSCH) ACK, an immediate ACK), a negative acknowledgement (NACK) signal (e.g., a PUCCH NACK, a PUSCH NACK, an immediate NACK), a scheduling request (SR), a buffer status report (BSR), a hybrid automatic repeat request (HARQ) indicator, a channel state indication (CSI), a CQI, a sounding reference signal (SRS), a demodulation reference signal (DMRS), PUSCH data, and/or various other suitable types of information. UL short burst portion 306 may include additional or alternative information, such as information pertaining to RACH procedures, scheduling requests, and various other suitable types of information.

As illustrated in FIG. 3, the end of DL data portion 304 may be separated in time from the beginning of UL short burst portion 306. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is one example of a DL-centric wireless communication structure, and alternative structures having similar features may exist without necessarily deviating from the aspects described herein.

As indicated above, FIG. 3 is provided as an example. Other examples may differ from what is described with regard to FIG. 3.

Figure 4:
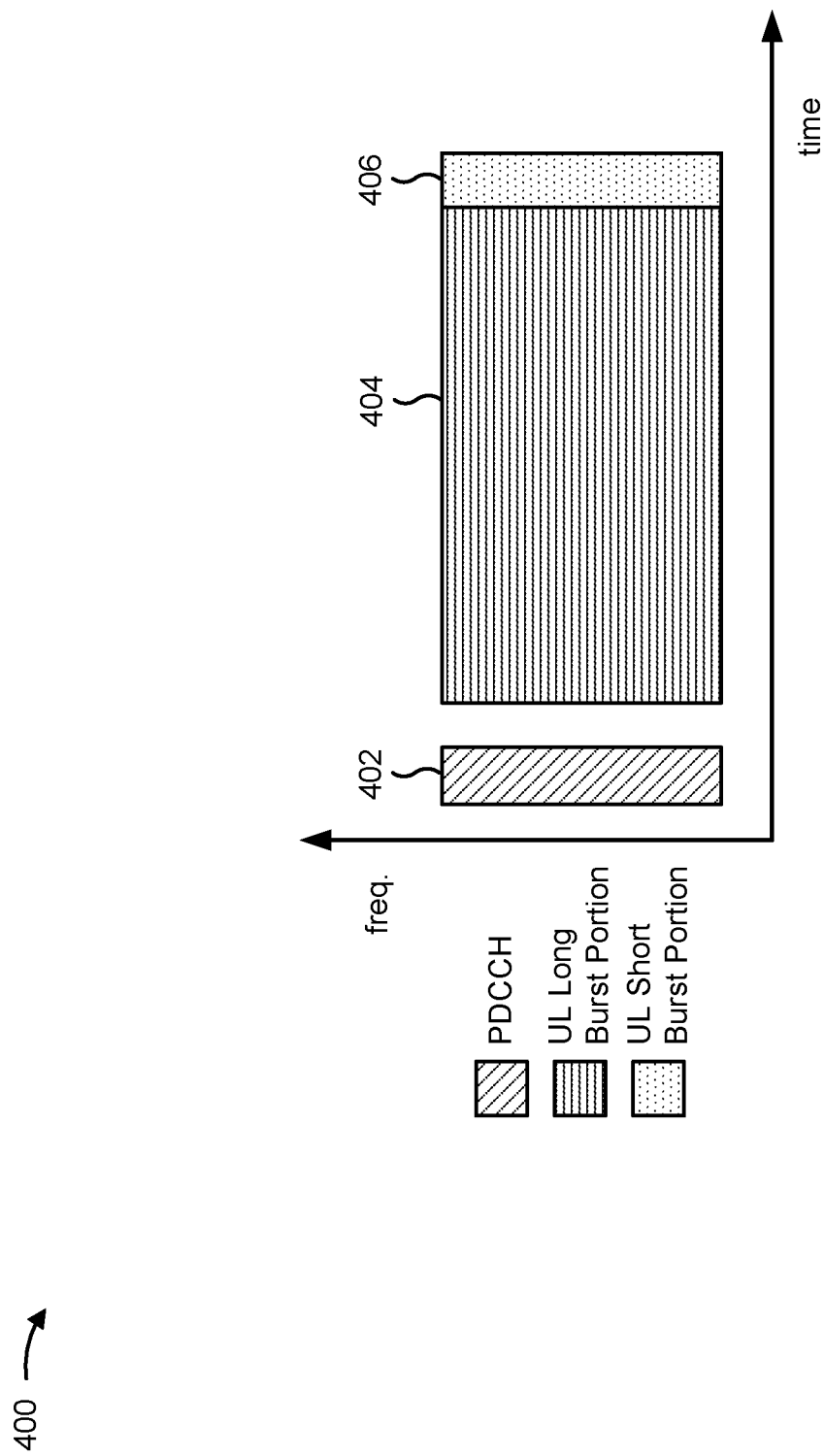
FIG. 4 is a diagram showing an example of an uplink-centric slot or wireless communication structure, in accordance with various aspects of the present disclosure.

FIG. 4 is a diagram 400 showing an example of an UL-centric slot or wireless communication structure, in accordance with various aspects of the present disclosure. The UL-centric slot may include a control portion 402. Control portion 402 may exist in the initial or beginning portion of the UL-centric slot. The control portion 402 in FIG. 4 may be similar to control portion 402 described above with reference to FIG. 4. The UL-centric slot may also include an UL long burst portion 404. UL long burst portion 404 may sometimes be referred to as the payload of the UL-centric slot. The UL portion may refer to the communication resources utilized to communicate UL data from the subordinate entity (e.g., UE) to the scheduling entity (e.g., UE or BS). In some configurations, control portion 402 may be a PDCCH. In some aspects, a UE may receive DCI in control portion 402. If the UE is to receive a RACH message in DCI, the UE may receive the RACH message in control portion 402.

As illustrated in FIG. 4, the end of control portion 402 may be separated in time from the beginning of UL long burst portion 404. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 406. UL short burst portion 406 in FIG. 4 may be similar to UL short burst portion 306 described above with reference to FIG. 3, and may include any of the information described above in connection with FIG. 3. The foregoing is one example of an UL-centric wireless communication structure, and alternative structures having similar features may exist without necessarily deviating from the aspects described herein.

As indicated above, FIG. 4 is provided as an example. Other examples may differ from what is described with regard to FIG. 4.

As explained earlier, a UE may transmit a RACH message to a base station to initiate communication with the base station. The RACH message may be what the UE first transmits when the UE is powered on. The RACH message may be transmitted on a physical RACH (PRACH) and may be referred to more generally as a PRACH communication. The UE may use the RACH message to request an uplink allocation from the base station.

A first RACH message may include a PRACH sequence (also referred to as a PRACH preamble or a PRACH preamble sequence) that may be used to differentiate UEs. The UE may use a PRACH format to determine the PRACH sequence and/or transmission properties of the PRACH sequence. The UE may receive an initial RACH configuration in a transmission from the base station and use the initial RACH configuration for transmitting the first RACH message. The first RACH message may initiate a RACH procedure to obtain the uplink allocation.

Figures 5A, 5B:
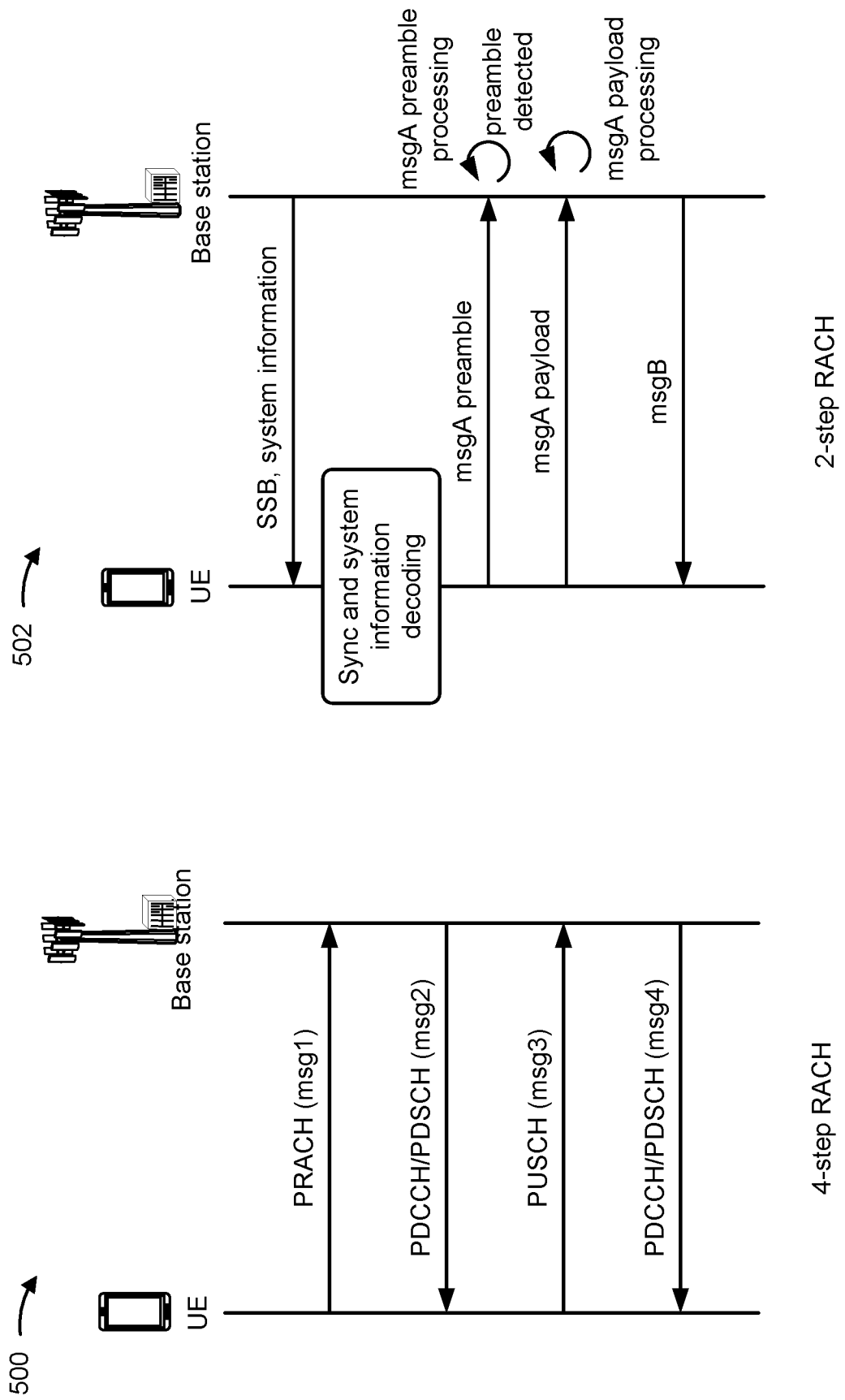
FIGS. 5A and 5B are diagrams conceptually illustrating an example of a 4-step random access channel (RACH) procedure and an example of a 2-step RACH procedure.

FIGS. 5A and 5B are diagrams illustrating an example 500 of a 4-step RACH procedure and an example 502 of a 2-step RACH procedure, respectively. In each example, a UE is performing a RACH procedure with a base station.

In LTE and NR, the 4-step RACH procedure may be a RACH procedure with a four message (msg1, msg2, msg3, msg4) handshake between the UE and the base station. The UE may transmit msg1 with a PRACH preamble to the base station on a PRACH, as an example of a first RACH message. The base station may transmit msg2 to the UE on a PDCCH and a PDSCH, as an example of a second RACH message. Msg2 may include a random access response. In a 4-step RACH procedure, the UE may monitor for the second RACH message (e.g., msg2) in DCI in the PDCCH. However, according to various aspects described herein, the UE may monitor for the second RACH message in a set of resource candidates that are based at least in part on transmitting the first RACH message absent DCI. That is, according to one example, the resources for the second RACH message are based at least in part on the transmitted first RACH message, DCI is not used to schedule the second RACH message, and the second RACH message is not received in DCI. In some aspects, the second RACH message may be scheduled via an RMSI message, or in other system information.

The UE may transmit msg3 on a PUSCH. Msg3 may include a contention request and device information. The base station may transmit msg4 on the PDCCH and the PDSCH. Msg4 may include a contention resolution. The contention request and contention resolution relate to resolving contention from multiple UEs that happen to use the same PRACH preamble.

In NR, the 2-step RACH procedure is another RACH procedure. In the 2-step procedure, a base station broadcasts system information and synchronization signal block (SSB) information to UEs. A UE may transmit a PRACH preamble as part of a msgA message to the base station, as an example of a first RACH message. MsgA may also include a payload. The base station may process the preamble, detect the preamble, and process the payload. The base station may send a response in msgB, as an example of a second RACH message. Msg1 and msg3 of the 4-step RACH may be considered to be collapsed into the msgA, and msg2 and msg4 are considered to be collapsed into msgB.

In a 2-step RACH procedure, the UE may monitor for the second RACH message (e.g., msgB) in DCI in the PDCCH. However, according to various aspects described herein, the UE may instead monitor for the second RACH message in a set of resource candidates that are based at least in part on the transmitted first RACH message absent DCI. That is, the resources for the second RACH message are based at least in part on the first RACH message, DCI is not used to schedule the second RACH message, and the second RACH message is not received in DCI. In some aspects, the second RACH message may be scheduled via an RMSI message, or in other system information.

As indicated above, FIG. 5 is provided as two examples of a RACH procedure. Other examples may differ from what is described with regard to FIG. 5.

A UE may transmit a first RACH message to a base station to initiate communication. The base station may respond with a second RACH message (e.g., msg2, msgB) that includes information on a PDCCH. However, if UE coverage or signal strengths are below a threshold level for certain frequencies (e.g., millimeter Wave 5G), the base station may be limited in how the base station can boost transmission of the second RACH message. The PDCCH may present a bottleneck for RACH messages. The base station is only able to use two or three symbols in the PDCCH because the PDCCH is limited to a CORESET and thus transmit power increases are limited to the two or three symbols.

According to various aspects described herein, the UE may monitor for and receive the second RACH message in time and frequency resources outside the PDCCH. This may be referred to as a PDCCH-less second RACH message (e.g., PDCCH-less msg2, PDCCH-less msgB) or a RACH message without a PDCCH. In one example, because DCI is included in the PDCCH, a RACH message without a PDCCH may be a RACH message without DCI. That is, the DCI may be absent from the RACH message that is without a PDCCH. By transmitting the second RACH message outside the PDCCH, the UE may have a better chance to receive the second RACH message because the UE may receive more symbols for the second RACH message (e.g., up to 14 symbols).

In a RACH procedure, data for the second RACH message on the PDSCH may normally be scheduled by DCI carried in the PDCCH. Instead of scheduling the data on the PDSCH via the PDCCH, the base station may schedule the PDSCH via information in the second RACH message, information in an RMSI message, other system information, and/or the like.

Figure 6:
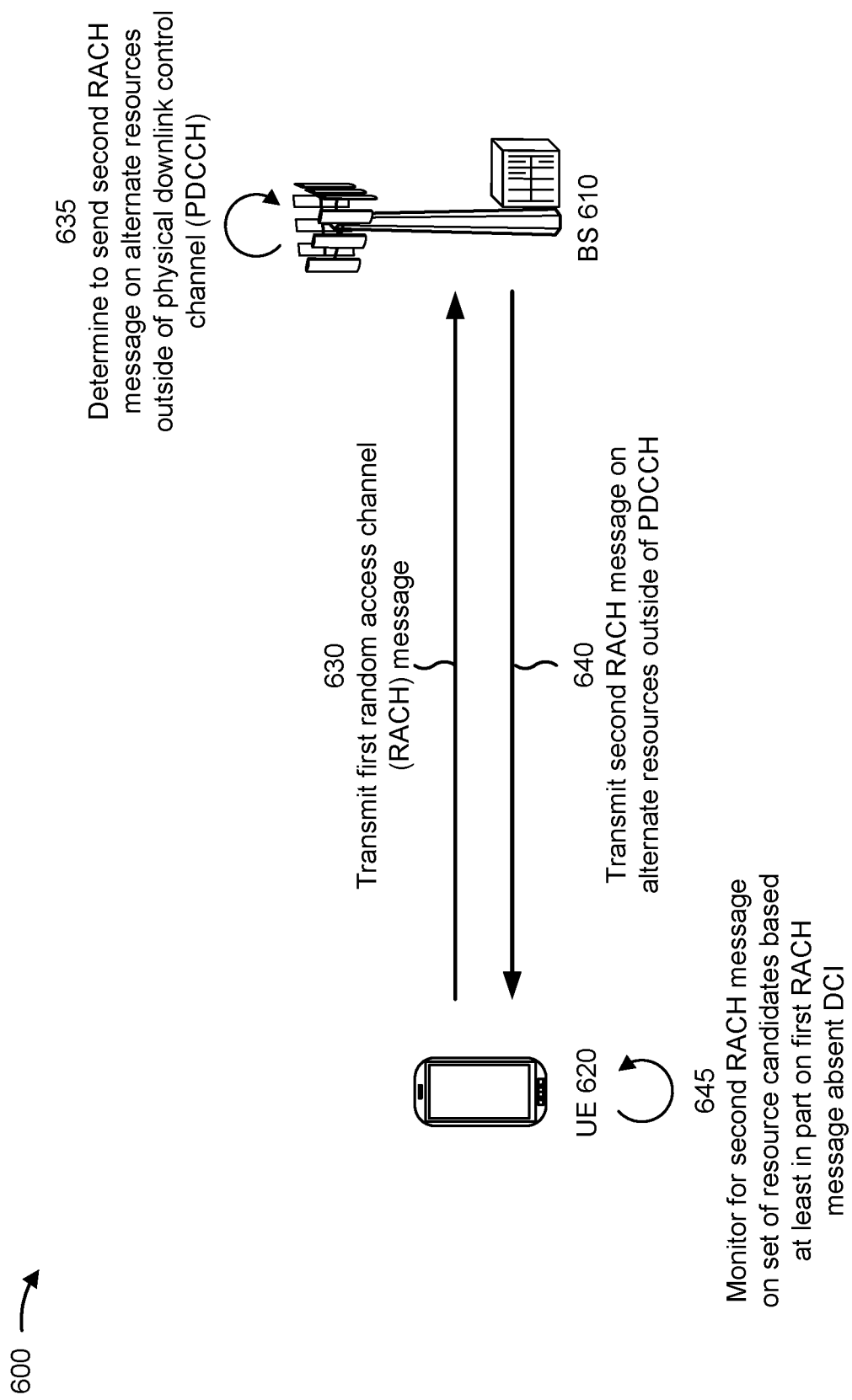
FIG. 6 illustrates an example of a base station transmitting a RACH message without a physical downlink control channel, in accordance with various aspects of the present disclosure.

FIG. 6 illustrates an example 600 of a base station transmitting a RACH message without a PDCCH, in accordance with various aspects of the present disclosure. FIG. 6 shows a base station (BS) 610 (e.g., BS 110 depicted in FIGS. 1 and 2) and a UE 620 (e.g., UE 120 depicted in FIGS. 1 and 2) that may communicate with one another.

As shown by reference number 630, UE 620 may transmit a first RACH message as part of a RACH procedure (e.g., 4-step RACH, 2-step RACH). The first RACH message may include a PRACH preamble. UE 620 may transmit the first RACH message in a first format that is selected from among the first format and a second format, where the first format indicates that BS 610 may transmit a responsive second RACH message in alternate resources outside the PDCCH, and the second format indicates that the second RACH message may be transmitted in the PDCCH, as normally expected.

In some aspects, UE 620 may determine to transmit the first RACH message in the first format based at least in part on a RACH type (e.g., 2-step, 4-step), a signal measurement, a RACH format, a set of RACH sequences (e.g., a preamble sequence subset), a RACH time resource, RACH occasions, a subset of RACH occasions, or a combination thereof. For example, UE 620 may be configured to use a RACH format and thus the first format may be the RACH format. UE 620 may receive the RACH format in a configuration message from BS 610, such as in an RMSI message or in other system information. BS 610 may determine to instruct UE 620 to transmit the first RACH message in the first format based at least in part on a RACH type, a signal measurement, a RACH format, a set of RACH sequences, a preamble sequence subset, RACH occasions, or a subset of RACH occasions, a RACH time resource, or a combination thereof.

In some aspects, UE 620 may determine to transmit the first RACH message in the first format, rather than the second format, based at least in part on a result of a signal measurement. UE 620 may measure an RSRP of an SSB broadcast and determine that the RSRP does not satisfy an RSRP threshold. As a result, UE 620 may determine to use a first format that may trigger a responsive second RACH message that is able to use more symbols and/or more transmit power in alternative resources outside the PDCCH. The RSRP threshold may be a threshold for the PDCCH.

In some aspects, UE 620 may determine to transmit the first RACH message in the first format based at least in part on a RACH type or a number of RACH sequences. For example, UE 620 may determine that a particular RACH type, a preamble sequence subset, and/or a threshold number of RACH sequences in a PRACH preamble may be necessary to identify UE 620. UE 620 may thus determine that the second RACH message may be better received in alternate resources outside the PDCCH.

In some aspects, UE 620 may determine to transmit the first RACH message in the first format based at least in part on any combination of factors discussed above. In some aspects, BS 610 may configure UE 620 with rules for selecting the first format over the second format (or any other format) and/or for monitoring the alternative resources for the second RACH message.

As shown by reference number 635, BS 610 may receive the first RACH message and determine how to transmit the second RACH message. For example, BS 610 may determine to transmit the second RACH message in the alternative resources outside the PDCCH based at least in part on receiving the first RACH message in the first format. BS 610 may schedule the RACH message via an RMSI message or another system information message that does not involve downlink control information in a PDDCH. In some aspects, BS 610 may determine to transmit the second RACH message in the alternative resources based at least in part on other characteristics of the first RACH message such as a RACH type, a signal measurement, a RACH format, a set of RACH sequences, a preamble sequence subset of the first RACH message, a RACH time resource, RACH occasions, a subset of RACH occasions, or a combination thereof.

As shown by reference number 640, BS 610 may transmit the second RACH message on the alternative resources outside of the PDCCH. These alternative resources may be part of a set of resource candidates. The set of resource candidates may be in the PDSCH. As shown by reference number 645, UE 620 may monitor the set of resource candidates for the second RACH message, because the alternative resources may be one or more of resources in the set of resource candidates. UE 620 may perform blind detection on the set of resource candidates to detect on which alternative resources UE 620 may receive the second RACH message. UE 620 may also perform a cyclic redundancy check (CRC) for any data received on the alternative resources. The set of resource candidates may be based at least in part on a RACH occasion, which may be a time window for receiving a RACH message. In some aspects, UE 620 may receive the set of resource candidates from BS 610 in an RMSI message or in other system information.

UE 620 may normally receive control information, such as DCI, in the PDCCH for determining a location and/or schedule for receiving data on the PDSCH, but if UE 620 is to monitor for the second RACH message outside of the PDCCH, there may have to be another way for UE 620 to receive the control information. In some aspects, UE 620 may receive the control information in the second RACH message, an RMSI message, or in other system information.

In some aspects, an SSB may include resources that carry a primary synchronization signal (PSS), a secondary synchronization signal (SSS), a physical broadcast channel (PBCH) 330, and/or the like. An SSB may also be referred to as a synchronization signal and PBCH block. A UE may monitor for and/or measure SSBs using different receive (Rx) beams during an initial network access procedure. Based at least in part on the monitoring and/or measuring, the UE may indicate one or more SSBs with a best signal parameter (e.g., an RSRP parameter and/or the like) to a base station. The base station and the UE may use the one or more indicated SSBs to select one or more beams to be used for communication between the base station and the UE (e.g., for a RACH procedure and/or the like). In some aspects, UE 620 may determine that a PDSCH is quasi-colocated with an SSB beam and thus UE 620 may use SSB beam information to locate the PDSCH.

UE 620 may monitor and receive the second RACH message outside the PDCCH, such as in resources that are based on the first RACH message, absent DCI. The second RACH message may have been boosted by BS 610 to improve coverage beyond what is available in the PDCCH. UE 620 may proceed with and complete the RACH procedure and successfully connect to BS 610 without wasting resources and without adding latency.

Figure 7:
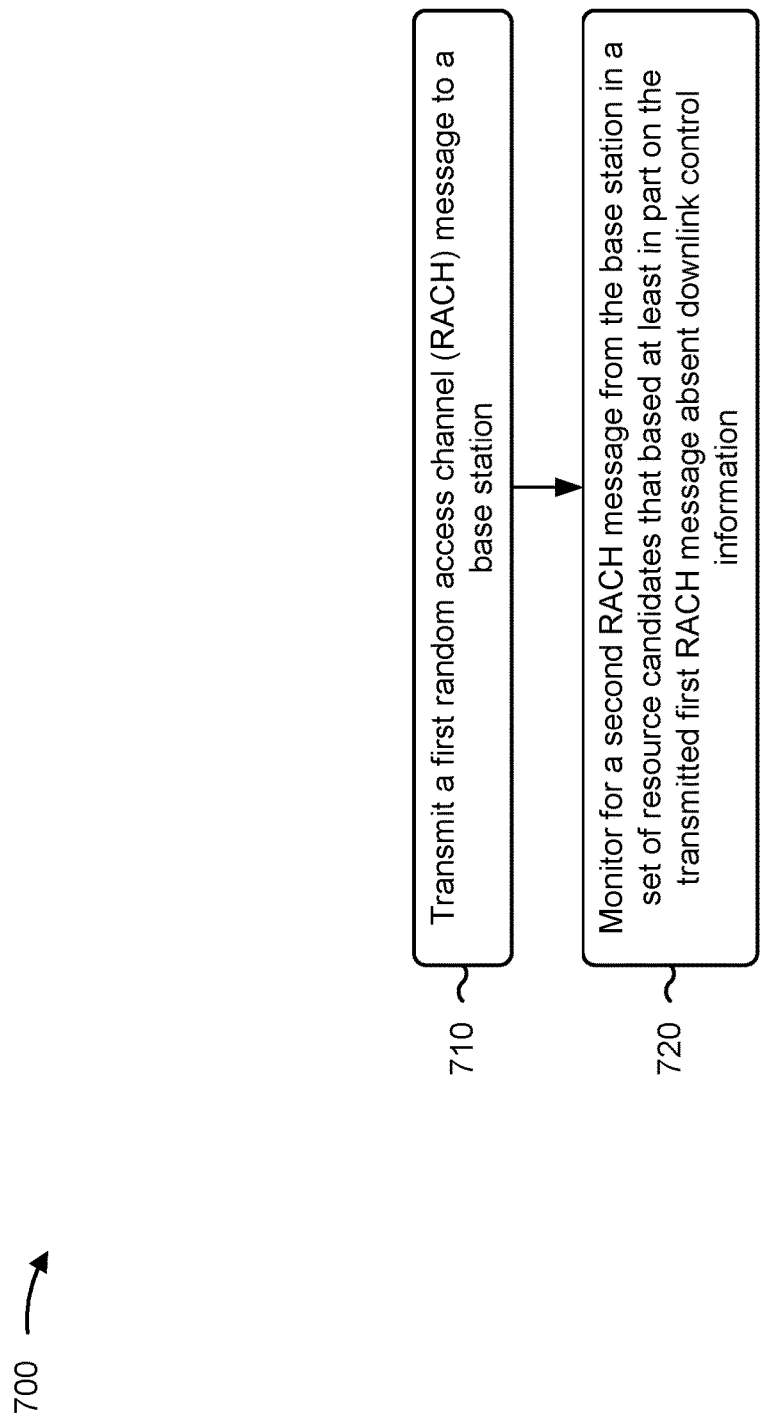
FIG. 7 is a diagram illustrating an example process performed, for example, by a UE, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120 depicted in FIGS. 1 and 2, UE 620 depicted in FIG. 6, and/or the like) performs operations associated with a RACH message without the PDCCH.

As shown in FIG. 7, in some aspects, process 700 may include transmitting a first RACH message to a base station (block 710). For example, the UE (e.g., using receive processor 258, transmit processor 264, controller/processor 280, memory 282, and/or the like) may transmit a first RACH message to a base station, as described above.

As further shown in FIG. 7, in some aspects, process 700 may include monitoring for a second RACH message from the base station in a set of resource candidates that are based at least in part on the transmitted first RACH message absent downlink control information (block 720). For example, the UE (e.g., using receive processor 258, transmit processor 264, controller/processor 280, memory 282, and/or the like) may monitor for a second RACH message from the base station in a set of resource candidates that are outside of a PDCCH based at least in part on the transmitted first RACH message, as described above.

Process 700 may include additional aspects, such as any single aspect or any combination of aspects described below and/or in connection with one or more other processes described elsewhere herein.

In a first aspect, monitoring for the second RACH message in the set of resource candidates is based at least in part on one or more of a RACH type, a preamble sequence subset of the first RACH message, RACH occasions, or a subset of RACH occasions.

In a second aspect, alone or in combination with the first aspect, process 700 includes receiving information identifying the set of resource candidates from the base station.

In a third aspect, alone or in combination with one or more of the first and second aspects, receiving the information identifying the set of resource candidates includes receiving the information identifying the set of resource candidates in a remaining minimum system information message or in another system information message.

In a fourth aspect, alone or in combination with one or more of the first through third aspects, monitoring for the second RACH message includes performing blind detection on one or more resource candidates of the set of resource candidates.

In a fifth aspect, alone or in combination with one or more of the first through fourth aspects, process 700 includes determining control information for data on a physical downlink shared channel based at least in part on the second RACH message.

In a sixth aspect, alone or in combination with one or more of the first through fifth aspects, the set of resource candidates is based at least in part on a RACH occasion.

In a seventh aspect, alone or in combination with one or more of the first through sixth aspects, process 700 includes determining that a physical downlink shared channel is quasi-colocated with an SSB beam based at least in part on a determination that the second RACH message from the base station is outside of the PDCCH.

In an eighth aspect, alone or in combination with one or more of the first through seventh aspects, monitoring for the second RACH message includes performing a CRC on one or more resource candidates of the set of resource candidates.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
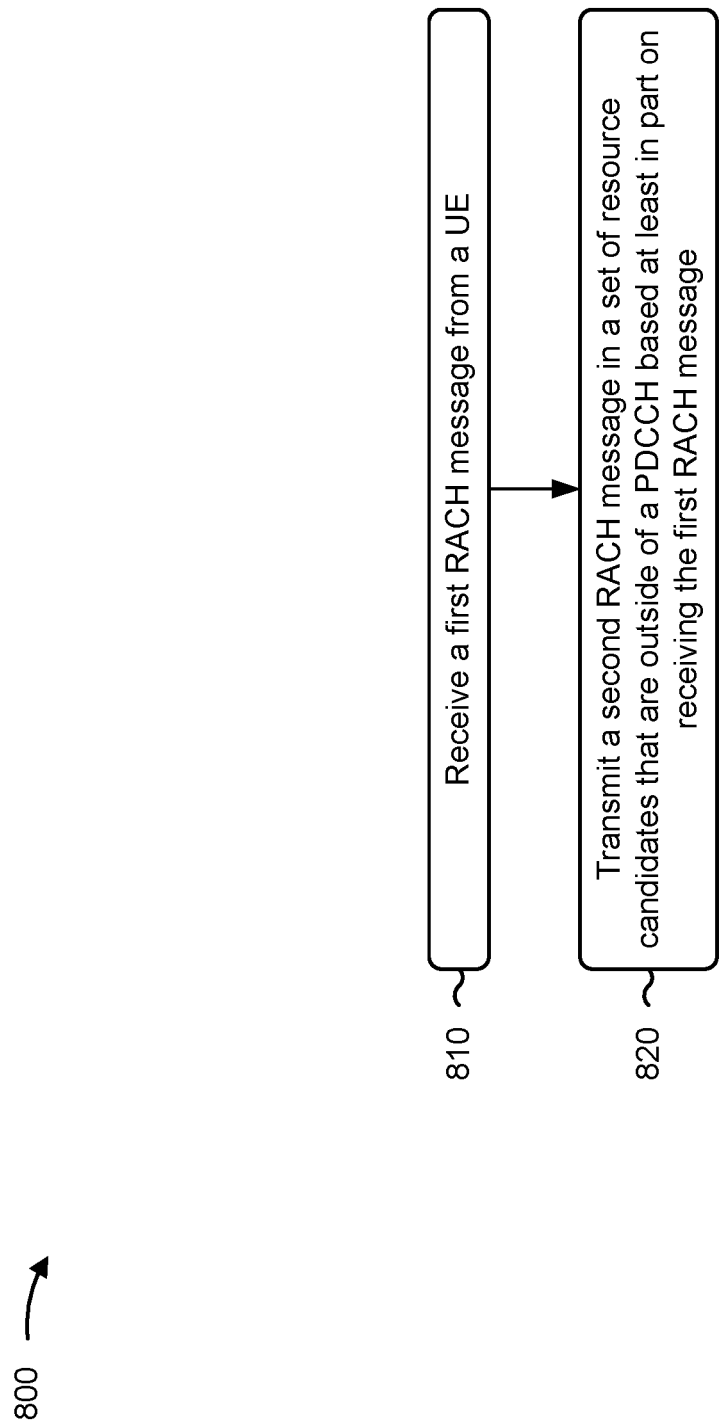
FIG. 8 is a diagram illustrating an example process performed, for example, by a base station, in accordance with various aspects of the present disclosure.

FIG. 8 is a diagram illustrating an example process 800 performed, for example, by a base station, in accordance with various aspects of the present disclosure. Example process 800 is an example where the base station (e.g., BS 110 depicted in FIGS. 1 and 2, BS 610 depicted in FIG. 6, and/or the like) performs operations associated with a RACH message without the PDCCH.

As shown in FIG. 8, in some aspects, process 800 may include receiving a first RACH message from a UE (block 810). For example, the base station (e.g., using transmit processor 220, receive processor 238, controller/processor 240, memory 242, and/or the like) may receive a first RACH message from a UE, as described above.

As further shown in FIG. 8, in some aspects, process 800 may include transmitting a second RACH message in a set of resource candidates that are outside of a PDCCH based at least in part on receiving the first RACH message (block 820). For example, the base station (e.g., using transmit processor 220, receive processor 238, controller/processor 240, memory 242, and/or the like) may transmit a second RACH message in a set of resource candidates that are outside of a PDCCH based at least in part on receiving the first RACH message, as described above.

Process 800 may include additional aspects, such as any single aspect or any combination of aspects described below and/or in connection with one or more other processes described elsewhere herein.

In a first aspect, process 800 includes determining a RACH configuration that specifies that the UE is to transmit the first RACH message in a first format from among the first format and a second format based at least in part on one or more of a RACH type, a signal measurement, a RACH format, a set of RACH sequences, a RACH time resource, or a combination of two or more of the signal measurement, the RACH format, the set of RACH sequences, or the RACH time resource; and transmitting the RACH configuration to the UE.

In a second aspect, alone or in combination with the first aspect, transmitting the RACH configuration includes transmitting the RACH configuration in a remaining minimum system information message or in another system information message.

In a third aspect, alone or in combination with one or more of the first and second aspects, process 800 includes transmitting information identifying the set of resource candidates to the UE.

In a fourth aspect, alone or in combination with one or more of the first through third aspects, transmitting the information identifying the set of resource candidates includes transmitting the information identifying the set of resource candidates in a remaining minimum system information message or in another system information message.

In a fifth aspect, alone or in combination with one or more of the first through fourth aspects, the set of resource candidates is based at least in part on a RACH occasion.

In a sixth aspect, alone or in combination with one or more of the first through fifth aspects, the second RACH message includes control information for data on a physical downlink shared channel.

In a seventh aspect, alone or in combination with one or more of the first through sixth aspects, the transmitting of the second RACH message in the set of resource candidates outside of the PDCCH is based at least in part on information in the first RACH message, where the information indicates one or more of a RACH message type, a preamble sequence subset of the first RACH message, RACH occasions, or a subset of RACH occasions.

In an eighth aspect, alone or in combination with one or more of the first through seventh aspects, the transmitting of the second RACH message in the set of resource candidates outside of the PDCCH is based at least in part on a determination that a signal measurement satisfies a threshold.

In a ninth aspect, alone or in combination with one or more of the first through eighth aspects, process 800 includes transmitting a RACH configuration that indicates that the second RACH message is to be transmitted in the set of resource candidates outside of the PDCCH based at least in part on a RACH type, a preamble sequence subset of the first RACH message, RACH occasions, or a subset of RACH occasions associated with the first RACH message.

In a tenth aspect, alone or in combination with one or more of the first through ninth aspects, the set of resource candidates are located in a PDSCH.

In an eleventh aspect, alone or in combination with one or more of the first through tenth aspects, the second RACH message is scheduled via an RMSI message or another system information message.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
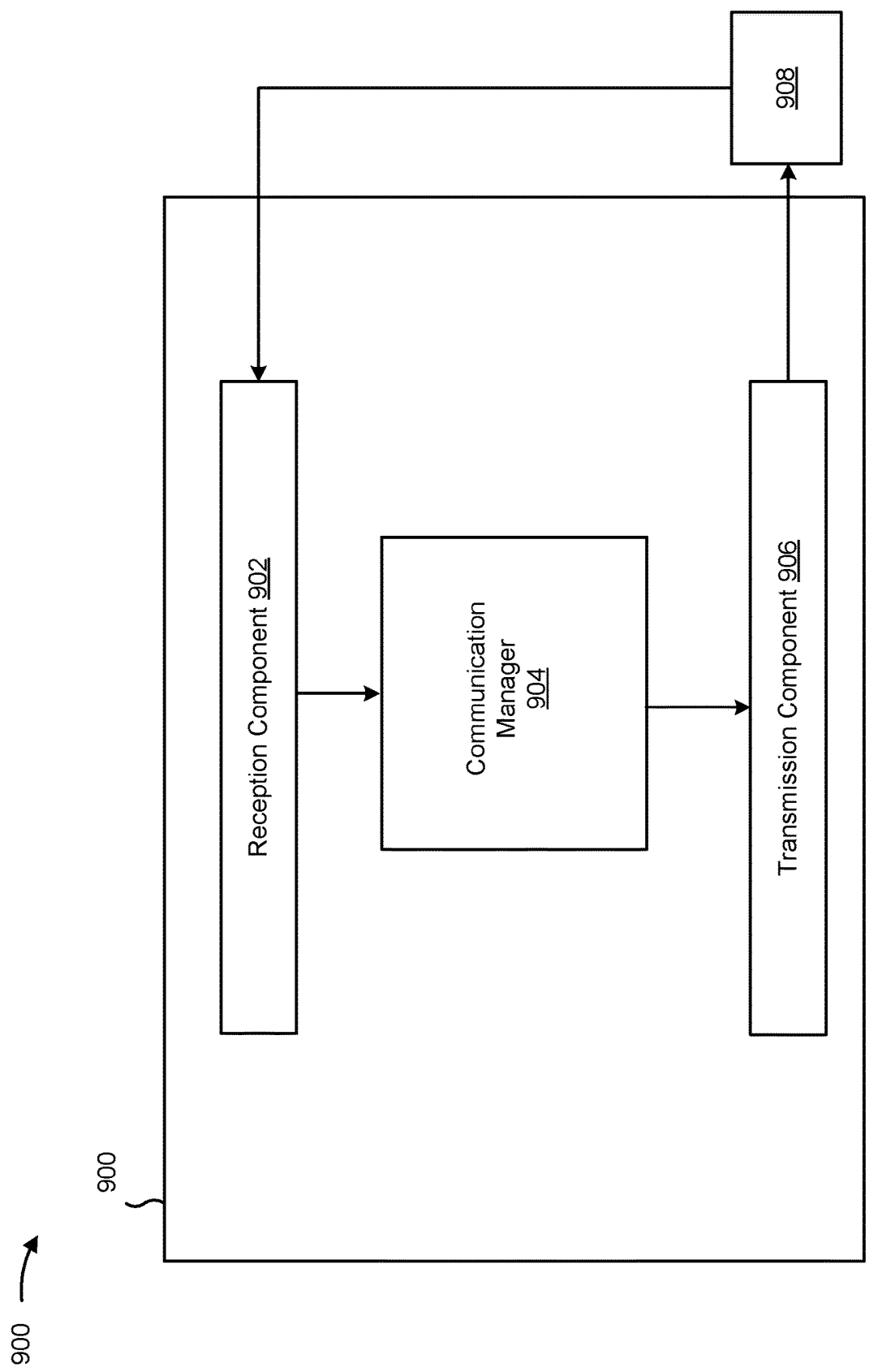
FIGS. 9-11 are block diagrams of an example apparatus of a UE for wireless communication, in accordance with various aspects of the present disclosure.

FIG. 9 is a block diagram of an example apparatus 900 for wireless communication in accordance with various aspects of the present disclosure. The apparatus 900 may be, be similar to, include, or be included in a UE (e.g., UE 620 shown in FIG. 6). In some aspects, the apparatus 900 includes a reception component 902, a communication manager 904, and a transmission component 906, which may be in communication with one another (for example, via one or more buses). As shown, the apparatus 900 may communicate with another apparatus 908 (such as a client, a server, a UE, a base station, or another wireless communication device) using the reception component 902 and the transmission component 906.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7. In some aspects, the apparatus 900 may include one or more components of the first UE described above in connection with FIG. 2.

The reception component 902 may provide means for receiving communications, such as reference signals, control information, data communications, or a combination thereof, from the apparatus 908. The reception component 902 may provide received communications to one or more other components of the apparatus 900, such as the communication manager 904. In some aspects, the reception component 902 may provide means for signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the first UE described above in connection with FIG. 2.

The transmission component 906 may provide means for transmitting communications, such as reference signals, control information, data communications, or a combination thereof, to the apparatus 908. In some aspects, the communication manager 904 may generate communications and may transmit the generated communications to the transmission component 906 for transmission to the apparatus 908. In some aspects, the transmission component 906 may provide means for performing signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 906 may include one or more antennas, a modulator, a transmit MIMO processor, a transmit processor, a controller/processor, a memory, or a combination thereof, of the first UE described above in connection with FIG. 2. In some aspects, the transmission component 906 may be co-located with the reception component 902 in a transceiver.

In some aspects, the communication manager 904 may provide means for transmitting a first RACH message to a base station, and means for monitoring for a second RACH message from the base station in a set of resource candidates that are based at least in part on the transmitted first RACH message absent downlink control information. In some aspects, the communication manager 904 may include a controller/processor, a memory, or a combination thereof, of the first UE described above in connection with FIG. 2. In some aspects, the communication manager 904 may include the reception component 902, the transmission component 906, and/or the like. In some aspects, the means provided by the communication manager 904 may include, or be included within, means provided by the reception component 902, the communication manager 904, and/or the like.

In some aspects, the communication manager 904 and/or one or more components of the communication manager 904 may include or may be implemented within hardware (e.g., one or more of the circuitry described in connection with FIG. 2). In some aspects, the communication manager 904 and/or one or more components thereof may include or may be implemented within a controller/processor, a memory, or a combination thereof, of the UE 120 described above in connection with FIG. 2.

In some aspects, the communication manager 904 and/or one or more components of the communication manager 904 may be implemented in code (e.g., as software or firmware stored in a memory), such as the code described in connection with FIG. 11. For example, the communication manager 904 and/or a component (or a portion of a component) of the communication manager 904 may be implemented as instructions or code stored in a non-transitory computer-readable medium and executable by a controller or a processor to perform the functions or operations of the communication manager 904 and/or the component. If implemented in code, the functions of the communication manager 904 and/or a component may be executed by a controller/processor, a memory, a scheduler, a communication unit, or a combination thereof, of the UE 120 described above in connection with FIG. 2.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
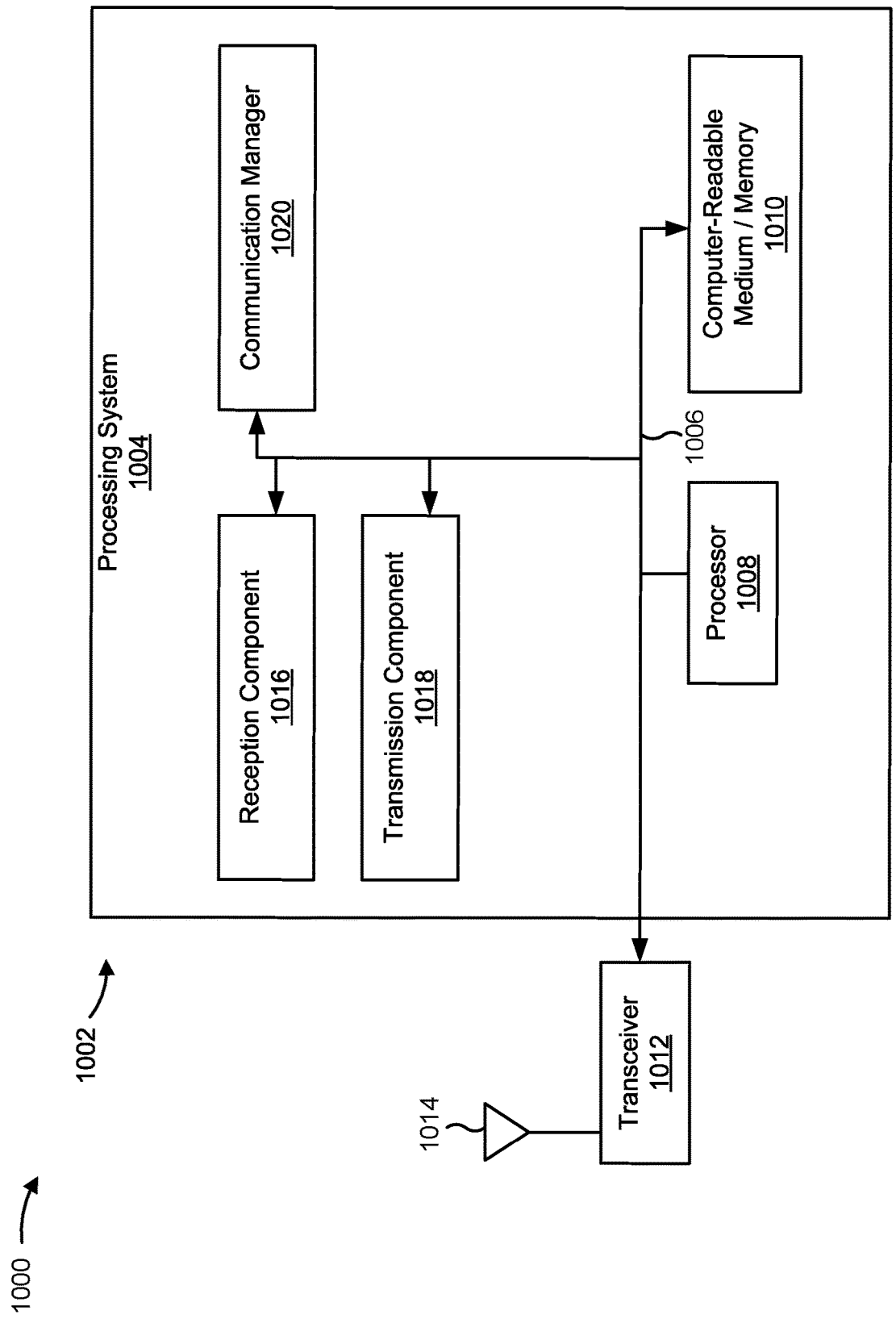

FIG. 10 is a diagram illustrating an example 1000 of a hardware implementation for an apparatus 1002 employing a processing system 1004. The apparatus 1002 may be, be similar to, include, or be included in the apparatus 900 shown in FIG. 9.

The processing system 1004 may be implemented with a bus architecture, represented generally by the bus 1006. The bus 1006 may include any number of interconnecting buses and bridges depending on the specific application of the processing system 1004 and the overall design constraints. The bus 1006 links together various circuits including one or more processors and/or hardware components, represented by a processor 1008, the illustrated components, and the computer-readable medium/memory 1010. The bus 1006 may also link various other circuits, such as timing sources, peripherals, voltage regulators, power management circuits, and/or the like.

The processing system 1004 may be coupled to a transceiver 1012. The transceiver 1012 is coupled to one or more antennas 1014. The transceiver 1012 provides a means for communicating with various other apparatuses over a transmission medium. The transceiver 1012 receives a signal from the one or more antennas 1014, extracts information from the received signal, and provides the extracted information to the processing system 1004, specifically a reception component 1016. In addition, the transceiver 1012 receives information from the processing system 1004, specifically a transmission component 1018, and generates a signal to be applied to the one or more antennas 1014 based at least in part on the received information.

The processor 1008 is coupled to the computer-readable medium/memory 1010. The processor 1008 is responsible for general processing, including the execution of software stored on the computer-readable medium/memory 1010. The software, when executed by the processor 1008, causes the processing system 1004 to perform the various functions described herein in connection with a client. The computer-readable medium/memory 1010 may also be used for storing data that is manipulated by the processor 1008 when executing software. The processing system 1004 may include any number of additional components not illustrated in FIG. 10. The components illustrated and/or not illustrated may be software modules running in the processor 1008, resident/stored in the computer readable medium/memory 1010, one or more hardware modules coupled to the processor 1008, or some combination thereof.

In some aspects, the processing system 1004 may be a component of the UE 120 and may include the memory 282 and/or at least one of the TX MIMO processor 266, the RX processor 258, and/or the controller/processor 280. In some aspects, the apparatus 1002 for wireless communication provides means for transmitting a first RACH message to a base station, and means for monitoring for a second RACH message from the base station in a set of resource candidates that are based at least in part on the transmitted first RACH message absent downlink control information. The aforementioned means may be one or more of the aforementioned components of the processing system 1004 of the apparatus 1002 configured to perform the functions recited by the aforementioned means. As described elsewhere herein, the processing system 1004 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 10 is provided as an example. Other examples may differ from what is described in connection with FIG. 10.

Figure 11:
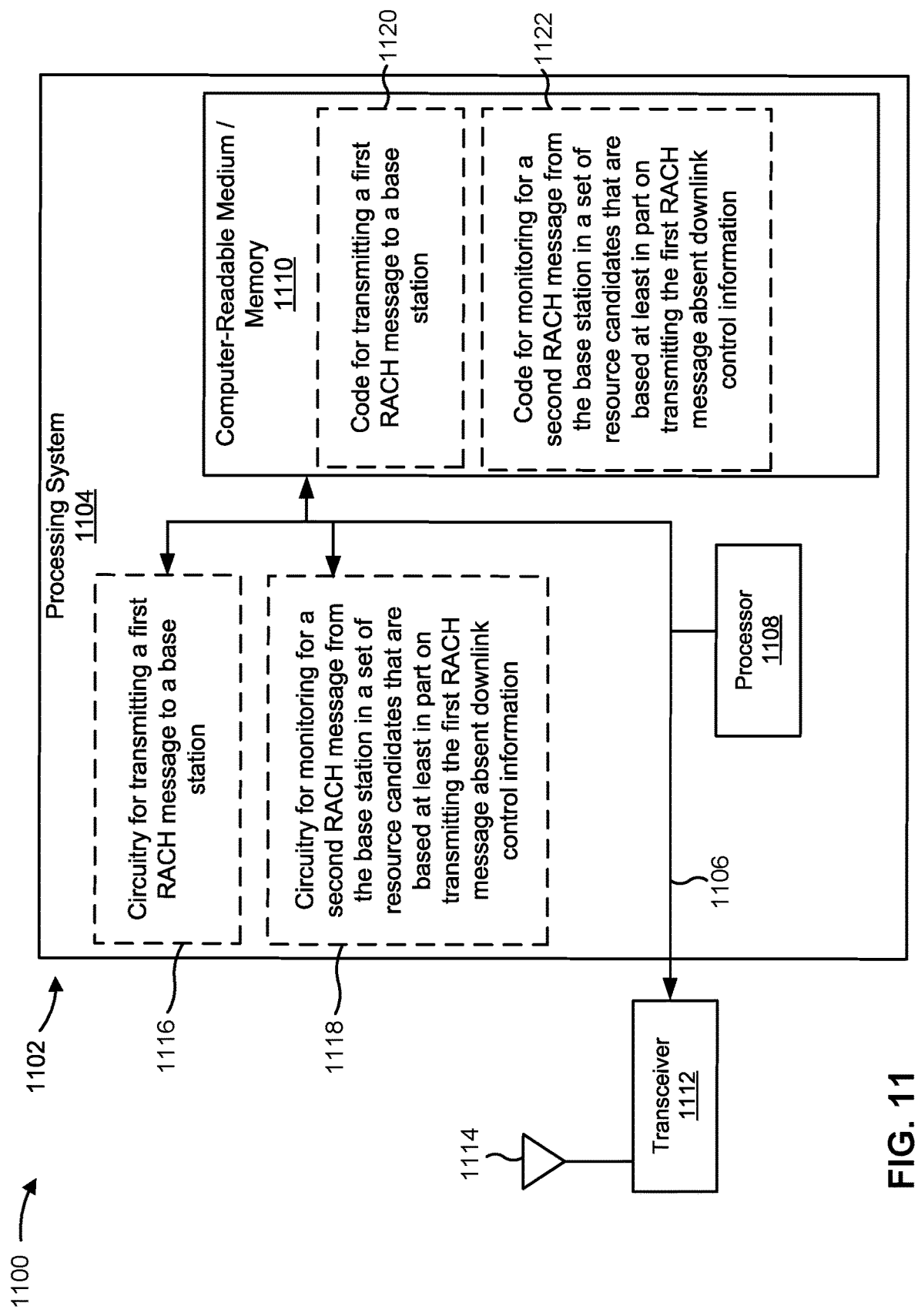

FIG. 11 is a diagram illustrating an example 1100 of an implementation of code and circuitry for an apparatus 1102 for wireless communication. The apparatus 1102 may be, be similar to, include, or be included in the apparatus 1002 shown in FIG. 10 and/or the apparatus 900 shown in FIG. 9. The apparatus 1102 may include a processing system 1104, which may include a bus 1106 coupling one or more components such as, for example, a processor 1108, computer-readable medium/memory 1110, a transceiver 1112, and/or the like. As shown, the transceiver 1112 may be coupled to one or more antennas 1114.

As further shown in FIG. 11, the apparatus 1102 may include circuitry for transmitting a first RACH message to a base station (circuitry 1116). For example, the apparatus 1102 may include circuitry 1116 to enable the apparatus 1102 to transmit a first RACH message to a base station.

As further shown in FIG. 11, the apparatus 1102 may include circuitry for monitoring for a second RACH message from the base station in a set of resource candidates that are based at least in part on the transmitted first RACH message absent downlink control information (circuitry 1118). For example, the apparatus 1102 may include circuitry 1118 to enable the apparatus 1102 to monitor for a second RACH message from the base station in a set of resource candidates that are based at least in part on the transmitted first RACH message absent downlink control information.

As further shown in FIG. 11, the apparatus 1102 may include, stored in computer-readable medium 1110, code for transmitting a first RACH message to a base station (code 1120). For example, the apparatus 1102 may include code 1120 that, when executed by the processor 1108, may cause the transceiver 1112 to transmit a first RACH message to a base station.

As further shown in FIG. 11, the apparatus 1102 may include, stored in computer-readable medium 1110, code for monitoring for a second RACH message from the base station in a set of resource candidates that are based at least in part on the transmitted first RACH message absent downlink control information (code 1122). For example, the apparatus 1102 may include code 1124 that, when executed by the processor 1108, may cause the transceiver 1112 to monitor for a second RACH message from the base station in a set of resource candidates that are based at least in part on the transmitted first RACH message absent downlink control information.

FIG. 11 is provided as an example. Other examples may differ from what is described in connection with FIG. 11.

Figure 12:
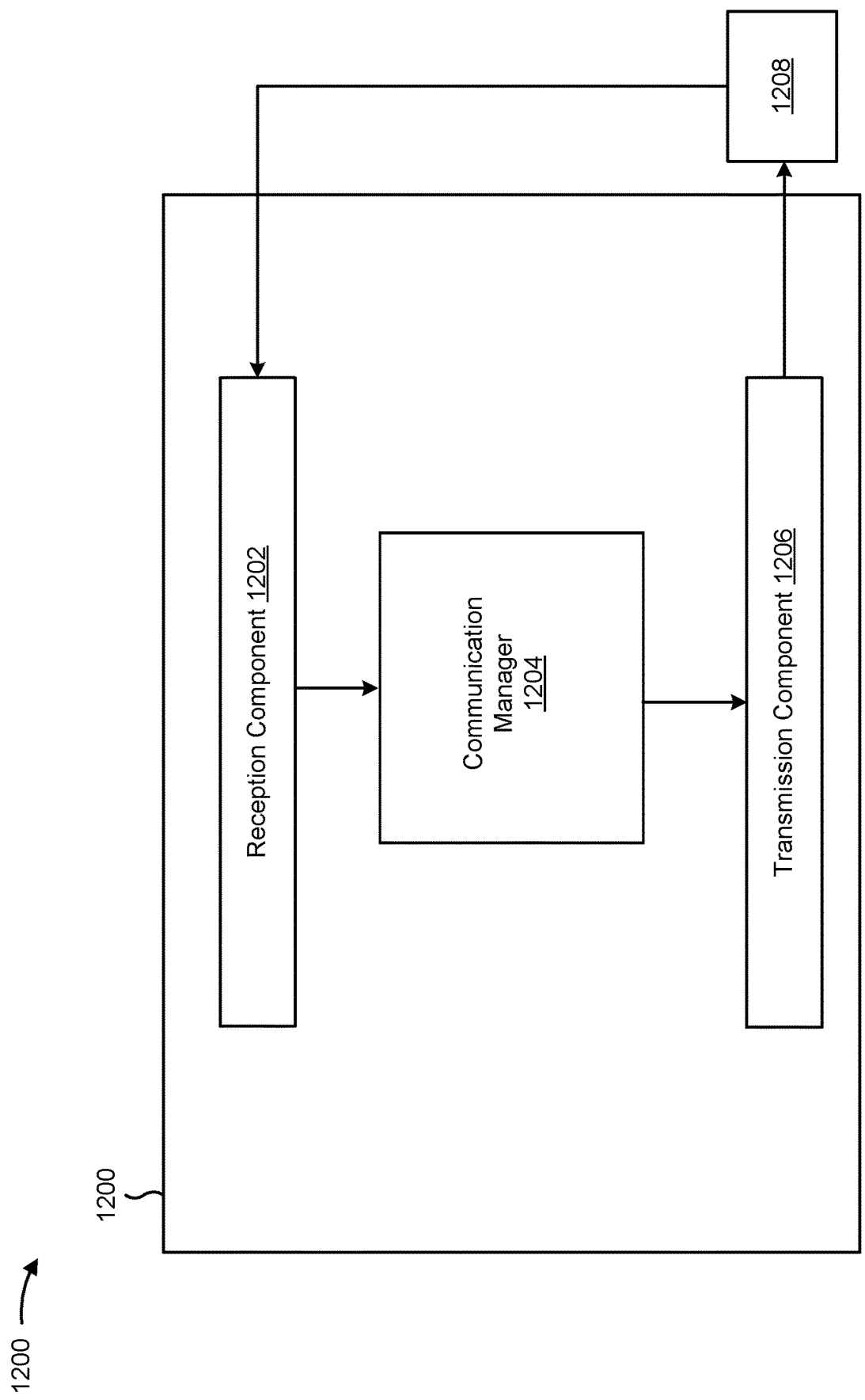
FIGS. 12-14 are block diagrams of an example apparatus of a base station for wireless communication, in accordance with various aspects of the present disclosure.

FIG. 12 is a block diagram of an example apparatus 1200 for wireless communication in accordance with various aspects of the present disclosure. The apparatus 1200 may be, be similar to, include, or be included in a base station (e.g., base station 610 shown in FIG. 6 and/or base station 110 shown in FIGS. 1 and 2). In some aspects, the apparatus 1200 includes a reception component 1202, a communication manager 1204, and a transmission component 1206, which may be in communication with one another (for example, via one or more buses). As shown, the apparatus 1200 may communicate with another apparatus 1208 (such as a client, a server, a UE, a base station, or another wireless communication device) using the reception component 1202 and the transmission component 1206.

In some aspects, the apparatus 1200 may be configured to perform one or more operations described herein in connection with FIG. 6. Additionally, or alternatively, the apparatus 1200 may be configured to perform one or more processes described herein, such as process 800 of FIG. 8. In some aspects, the apparatus 1200 may include one or more components of the base station described above in connection with FIG. 2.

The reception component 1202 may provide means for receiving communications, such as reference signals, control information, data communications, or a combination thereof, from the apparatus 1208. The reception component 1202 may provide received communications to one or more other components of the apparatus 1200, such as the communication manager 1204. In some aspects, the reception component 1202 may provide means for performing signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1202 may include one or more antennas, a demodulator, a MIMO detector, a receive processor, a controller/processor, a memory, or a combination thereof, of the base station described above in connection with FIG. 2.

The transmission component 1206 may provide means for transmitting communications, such as reference signals, control information, data communications, or a combination thereof, to the apparatus 1208. In some aspects, the communication manager 1204 may generate communications and may transmit the generated communications to the transmission component 1206 for transmission to the apparatus 1208. In some aspects, the transmission component 1206 may provide means for performing signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1206 may include one or more antennas, a modulator, a transmit MIMO processor, a transmit processor, a controller/processor, a memory, or a combination thereof, of the base station described above in connection with FIG. 2. In some aspects, the transmission component 1206 may be co-located with the reception component 1202 in a transceiver.

The communication manager 1204 may provide means for receiving a first RACH message from a UE, and means for transmitting a second RACH message in a set of resource candidates that are outside of a PDCCH based at least in part on receiving the first RACH message. In some aspects, the communication manager 1204 may include a controller/processor, a memory, a scheduler, a communication unit, or a combination thereof, of the base station described above in connection with FIG. 2. In some aspects, the communication manager 1204 may include the reception component 1202, the transmission component 1206, and/or the like. In some aspects, the means provided by the communication manager 1204 may include, or be included within means provided by the reception component 1202, the transmission component 1204, and/or the like.

In some aspects, the communication manager 1204 and/or one or more components thereof may include or may be implemented within hardware (e.g., one or more of the circuitry described in connection with FIG. 14). In some aspects, the communication manager 1204 and/or one or more components thereof may include or may be implemented within a controller/processor, a memory, or a combination thereof, of the BS 110 described above in connection with FIG. 2.

In some aspects, the communication manager 1204 and/or one or more components thereof may be implemented in code (e.g., as software or firmware stored in a memory), such as the code described in connection with FIG. 14. For example, the communication manager 1204 and/or a component (or a portion of a component) of the communication manager 1204 may be implemented as instructions or code stored in a non-transitory computer-readable medium and executable by a controller or a processor to perform the functions or operations of the communication manager 1204 and/or the component. If implemented in code, the functions of the communication manager 1204 and/or a component may be executed by a controller/processor, a memory, a scheduler, a communication unit, or a combination thereof, of the BS 110 described above in connection with FIG. 2.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
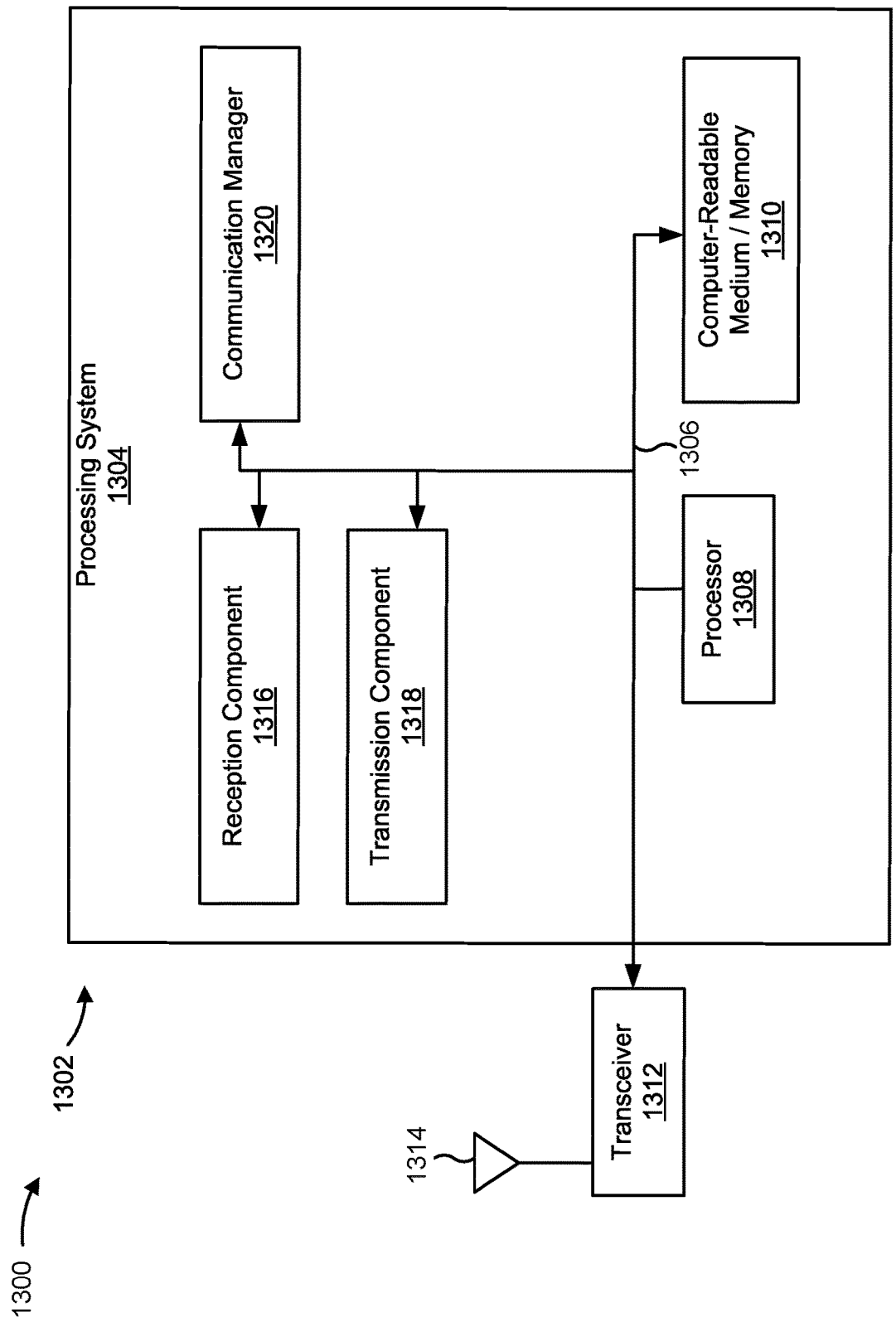

FIG. 13 is a diagram illustrating an example 1300 of a hardware implementation for an apparatus 1302 employing a processing system 1304. The apparatus 1302 may be, be similar to, include, or be included in the apparatus 1200 shown in FIG. 12.

The processing system 1304 may be implemented with a bus architecture, represented generally by the bus 1306. The bus 1306 may include any number of interconnecting buses and bridges depending on the specific application of the processing system 1304 and the overall design constraints. The bus 1306 links together various circuits including one or more processors and/or hardware components, represented by a processor 1308, the illustrated components, and the computer-readable medium/memory 1310. The bus 1306 may also link various other circuits, such as timing sources, peripherals, voltage regulators, power management circuits, and/or the like.

The processing system 1304 may be coupled to a transceiver 1312. The transceiver 1312 is coupled to one or more antennas 1314. The transceiver 1312 provides a means for communicating with various other apparatuses over a transmission medium. The transceiver 1312 receives a signal from the one or more antennas 1314, extracts information from the received signal, and provides the extracted information to the processing system 1304, specifically a reception component 1316. In addition, the transceiver 1312 receives information from the processing system 1304, specifically a transmission component 1318, and generates a signal to be applied to the one or more antennas 1314 based at least in part on the received information.

The processor 1308 is coupled to the computer-readable medium/memory 1310. The processor 1308 is responsible for general processing, including the execution of software stored on the computer-readable medium/memory 1310. The software, when executed by the processor 1308, causes the processing system 1304 to perform the various functions described herein in connection with a server. The computer-readable medium/memory 1310 may also be used for storing data that is manipulated by the processor 1308 when executing software. The processing system 1304 may include any number of additional components not illustrated in FIG. 13. The components illustrated and/or not illustrated may be software modules running in the processor 1308, resident/stored in the computer readable medium/memory 1310, one or more hardware modules coupled to the processor 1308, or some combination thereof.

In some aspects, the processing system 1304 may be a component of the UE 120 and may include the memory 282 and/or at least one of the TX MIMO processor 266, the RX processor 258, and/or the controller/processor 280. In some aspects, the apparatus 1302 for wireless communication provides means for receiving a first RACH message from a UE, and means for transmitting a second RACH message in a set of resource candidates that are outside of a PDCCH based at least in part on receiving the first RACH message. The aforementioned means may be one or more of the aforementioned components of the processing system 1304 of the apparatus 1302 configured to perform the functions recited by the aforementioned means. As described elsewhere herein, the processing system 1304 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 13 is provided as an example. Other examples may differ from what is described in connection with FIG. 13.

Figure 14:
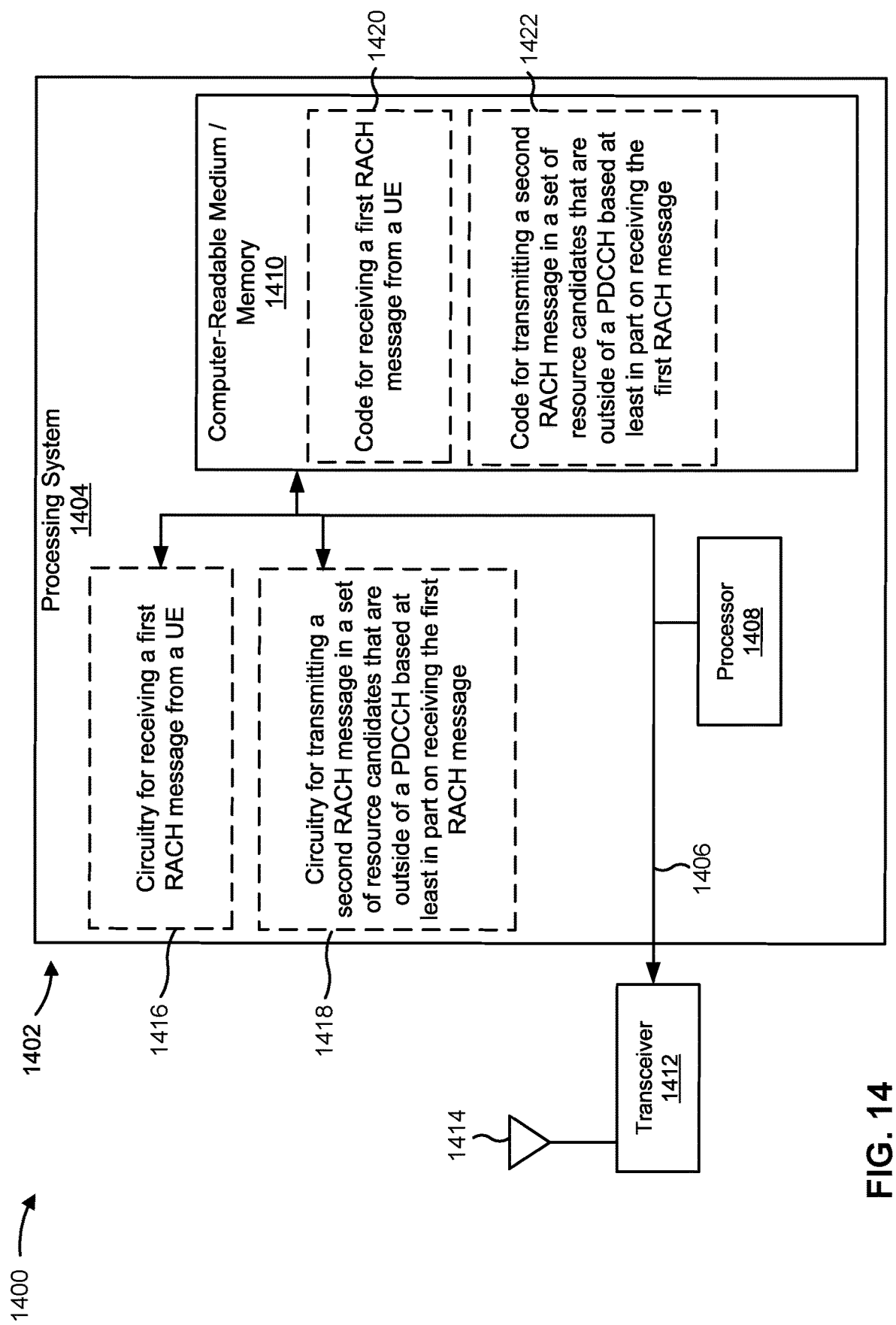

FIG. 14 is a diagram illustrating an example 1400 of an implementation of code and circuitry for an apparatus 1402 for wireless communication. The apparatus 1402 may be, be similar to, include, or be included in the apparatus 1102 shown in FIG. 11, and/or the apparatus 1000 shown in FIG. 10. The apparatus 1402 may include a processing system 1404, which may include a bus 1406 coupling one or more components such as, for example, a processor 1408, computer-readable medium/memory 1410, a transceiver 1412, and/or the like. As shown, the transceiver 1412 may be coupled to one or more antennas 1414.

As further shown in FIG. 14, the apparatus 1402 may include circuitry for receiving a first RACH message from a UE (circuitry 1416). For example, the apparatus 1402 may include circuitry 1416 to enable the apparatus 1402 to receive a first RACH message from a UE.

As further shown in FIG. 14, the apparatus 1402 may include circuitry for receiving the update from the UE based at least in part on the federated learning configuration (circuitry 1418). For example, the apparatus 1402 may include circuitry 1418 to enable the apparatus 1402 to receive the update from the UE based at least in part on the federated learning configuration.

As further shown in FIG. 14, the apparatus 1402 may include, stored in computer-readable medium 1410, code for receiving a first RACH message from a UE (code 1420). For example, the apparatus 1402 may include code 1420 that, when executed by the processor 1408, may cause the transceiver 1412 to receiving a first RACH message from a UE.

As further shown in FIG. 14, the apparatus 1402 may include, stored in computer-readable medium 1410, code for transmitting a second RACH message in a set of resource candidates that are outside of a PDCCH based at least in part on receiving the first RACH message (code 1422). For example, the apparatus 1402 may include code 1422 that, when executed by the processor 1408, may cause the transceiver 1412 to transmit a second RACH message in a set of resource candidates that are outside of a PDCCH based at least in part on receiving the first RACH message.

FIG. 14 is provided as an example. Other examples may differ from what is described in connection with FIG. 14.

The following provides an overview of aspects of the present disclosure:

Aspect 1: A method of wireless communication performed by a user equipment (UE), comprising: transmitting a first random access channel (RACH) message to a base station; and monitoring for a second RACH message from the base station in a set of resource candidates that are based at least in part on the transmitted first RACH message absent downlink control information.

Aspect 2: The method of aspect 1, wherein the monitoring for the second RACH message in the set of resource candidates is based at least in part on one or more of a RACH type, a preamble sequence subset of the first RACH message, RACH occasions, or a subset of RACH occasions.

Aspect 3: The method of aspect 1 or 2, further comprising receiving information identifying the set of resource candidates from the base station.

Aspect 4: The method of aspect 3, wherein receiving the information identifying the set of resource candidates includes receiving the information identifying the set of resource candidates in a remaining minimum system information message or in another system information message.

Aspect 5: The method of any of aspects 1-4, wherein monitoring for the second RACH message includes performing blind detection on one or more resource candidates of the set of resource candidates.

Aspect 6: The method of any of aspects 1-5, wherein monitoring for the second RACH message includes performing a cyclic redundancy check on one or more resource candidates of the set of resource candidates.

Aspect 7: The method of any of aspects 1-6, further comprising determining control information for data on a physical downlink shared channel based at least in part on the second RACH message.

Aspect 8: The method of any of aspects 1-7, wherein the set of resource candidates is based at least in part on a RACH occasion.

Aspect 9: The method of any of aspects 1-8, further comprising determining that a physical downlink shared channel is quasi-colocated with a synchronization signal and physical broadcast channel block (SSB) beam based at least in part on a determination that the second RACH message from the base station is outside of a physical downlink control channel (PDCCH).

Aspect 10: The method of any of aspects 1-9, wherein the set of resource candidates are located in a physical downlink shared channel.

Aspect 11: The method of any of aspects 1-10, wherein the second RACH message is scheduled via an RMSI message or another system information message.

Aspect 12: A method of wireless communication performed by a base station, comprising: receiving a first random access channel (RACH) message from a user equipment (UE); and transmitting a second RACH message in a set of resource candidates that are outside of a physical downlink control channel (PDCCH) based at least in part on receiving the first RACH message.

Aspect 13: The method of aspect 12, wherein the transmitting of the second RACH message in the set of resource candidates outside of the PDCCH is based at least in part on information in the first RACH message, wherein the information indicates one or more of a RACH message type, a preamble sequence subset of the first RACH message, RACH occasions, or a subset of RACH occasions.

Aspect 14: The method of aspect 12 or 13, wherein the set of resource candidates are located in a physical downlink shared channel.

Aspect 15: The method of any of aspects 12-14, further comprising scheduling the second RACH message via a remaining minimum system information message or another system information message.

Aspect 16: The method of any of aspects 12-15, wherein the transmitting of the second RACH message in the set of resource candidates outside of the PDCCH is based at least in part on a determination that a signal measurement satisfies a threshold.

Aspect 17: The method of any of aspects 12-16, further comprising transmitting a RACH configuration that indicates that the second RACH message is to be transmitted in the set of resource candidates outside of the PDCCH based at least in part on a RACH type, a preamble sequence subset of the first RACH message, RACH occasions, or a subset of RACH occasions associated with the first RACH message.

Aspect 18: The method of aspect 17, wherein transmitting the RACH configuration includes transmitting the RACH configuration in a remaining minimum system information message or in another system information message.

Aspect 19: The method of any of aspects 12-18, further comprising transmitting information identifying the set of resource candidates to the UE.

Aspect 20: The method of aspect 19, wherein transmitting the information identifying the set of resource candidates includes transmitting the information identifying the set of resource candidates in a remaining minimum system information message or in another system information message.

Aspect 21: The method of any of aspects 12-20, wherein the set of resource candidates is based at least in part on a RACH occasion.

Aspect 22: The method of any of aspects 12-21, wherein the second RACH message includes control information for data on a physical downlink shared channel.

Aspect 23: An apparatus for wireless communication at a device, comprising a processor; memory coupled with the processor; and instructions stored in the memory and executable by the processor to cause the apparatus to perform the method of one or more aspects of aspects 1-22.

Aspect 20: A device for wireless communication, comprising a memory and one or more processors coupled to the memory, the memory and the one or more processors configured to perform the method of one or more aspects of aspects 1-22.

Aspect 21: An apparatus for wireless communication, comprising at least one means for performing the method of one or more aspects of aspects 1-22.

Aspect 22: A non-transitory computer-readable medium storing code for wireless communication, the code comprising instructions executable by a processor to perform the method of one or more aspects of aspects 1-22.

Aspect 23: A non-transitory computer-readable medium storing a set of instructions for wireless communication, the set of instructions comprising one or more instructions that, when executed by one or more processors of a device, cause the device to perform the method of one or more aspects of aspects 1-22.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. An apparatus for wireless communication at a user equipment (UE), the apparatus comprising:
    one or more memories; and
    one or more processors, coupled to the one or more memories, configured to cause the UE to:
        transmit a first random access channel (RACH) message to a network entity; and
        monitor, absent downlink control information, for a second RACH message in a set of resource candidates based at least in part on the first RACH message.

2. The apparatus of claim 1, wherein, to monitor for the second RACH message, the one or more processors are configured to cause the UE to:
    monitor for the second RACH message in the set of resource candidates based at least in part on one or more of a RACH type, a preamble sequence subset of the first RACH message, RACH occasions, or a subset of RACH occasions.

3. The apparatus of claim 1, wherein the set of resource candidates are located in a physical downlink shared channel.

4. The apparatus of claim 1, wherein the second RACH message is scheduled via a remaining minimum system information message or another system information message.

5. The apparatus of claim 1, wherein the one or more processors are further configured to cause the UE to:
    receive, from the network entity, information that identifies the set of resource candidates.

6. The apparatus of claim 5, wherein, to receive the information that identifies the set of resource candidates, the one or more processors are configured to cause the UE to:
    receive the information that identifies the set of resource candidates in a remaining minimum system information message or in another system information message.

7. The apparatus of claim 1, wherein the one or more processors are further configured to cause the UE to:
    perform blind detection on one or more resource candidates of the set of resource candidates.

8. The apparatus of claim 1, wherein the one or more processors are further configured to cause the UE to:
    perform a cyclic redundancy check on one or more resource candidates of the set of resource candidates.

9. An apparatus for wireless communication at a network entity, comprising:
one or more memories; and
one or more processors, coupled to the one or more memories, configured to cause the network entity to:
receive a first random access channel (RACH) message; and
transmit, based at least in part on the first RACH message, a second RACH message in a set of resource candidates scheduled absent downlink control information.

10. The apparatus of claim 9,
wherein, to transmit the second RACH message, the one or more processors are further configured to cause the network entity to:
transmit the second RACH message based at least in part on information in the first RACH message, and
wherein the information indicates one or more of a RACH message type, a preamble sequence subset of the first RACH message, RACH occasions, or a subset of RACH occasions.

11. The apparatus of claim 9, wherein the set of resource candidates are located in a physical downlink shared channel.

12. The apparatus of claim 9, wherein the one or more processors are further configured to cause the network entity to:
schedule the second RACH message via a remaining minimum system information message or another system information message.

13. The apparatus of claim 9, wherein, to transmit the second RACH message, the one or more processors are configured to cause the network entity to:
transmit the second RACH message in the set of resource candidates based at least in part on a determination that a signal measurement satisfies a threshold.

14. The apparatus of claim 9, wherein the one or more processors are further configured to cause the network entity to:
transmit a RACH configuration that indicates the second RACH message is to be transmitted in the set of resource candidates based at least in part on a RACH type, a preamble sequence subset of the first RACH message, RACH occasions, or a subset of RACH occasions associated with the first RACH message.

15. The apparatus of claim 14, wherein, to transmit the RACH configuration, the one or more processors are configured to cause the network entity to:
transmit the RACH configuration in a remaining minimum system information message or in another system information message.

16. The apparatus of claim 9, wherein the one or more processors are further configured to:
transmit information that identifies the set of resource candidates to a user equipment (UE).

17. A method of wireless communication performed at a user equipment (UE), comprising:
transmitting a first random access channel (RACH) message to a network entity; and
monitoring, absent downlink control information, for a second RACH message in a set of resource candidates based at least in part on the first RACH message.

18. The method of claim 17, wherein monitoring for the second RACH message comprises:
monitoring for the second RACH message in the set of resource candidates based at least in part on one or more of a RACH type, a preamble sequence subset of the first RACH message, RACH occasions, or a subset of RACH occasions.

19. The method of claim 17, wherein the set of resource candidates are located in a physical downlink shared channel.

20. The method of claim 17, wherein the second RACH message is scheduled via a remaining minimum system information message or another system information message.

21. The method of claim 17, further comprising:
receiving, from the network entity, information identifying the set of resource candidates.

22. The method of claim 21, wherein receiving the information identifying the set of resource candidates comprises:
receiving the information identifying the set of resource candidates in a remaining minimum system information message or in another system information message.

23. The method of claim 17, further comprising:
performing blind detection on one or more resource candidates of the set of resource candidates.

24. The method of claim 17, further comprising:
performing a cyclic redundancy check on one or more resource candidates of the set of resource candidates.

25. A method of wireless communication performed at a network entity, comprising:
receiving a first random access channel (RACH) message; and
transmitting, based at least in part on the first RACH message, a second RACH message in a set of resource candidates that are scheduled absent downlink control information.

26. The method of claim 25,
wherein transmitting the second RACH message comprises:
transmitting the second RACH message based at least in part on information in the first RACH message, and
wherein the information indicates one or more of a RACH message type, a preamble sequence subset of the first RACH message, RACH occasions, or a subset of RACH occasions.

27. The method of claim 25, wherein the set of resource candidates are located in a physical downlink shared channel.

28. The method of claim 25, further comprising:
scheduling the second RACH message via a remaining minimum system information message or another system information message.

29. The method of claim 25, wherein transmitting the second RACH message comprises:
transmitting the second RACH message in the set of resource candidates based at least in part on a determination that a signal measurement satisfies a threshold.

30. The method of claim 25, further comprising:
transmitting a RACH configuration that indicates the second RACH message is to be transmitted in the set of resource candidates based at least in part on a RACH type, a preamble sequence subset of the first RACH message, RACH occasions, or a subset of RACH occasions associated with the first RACH message.

31. A non-transitory computer-readable medium storing a set of instructions for wireless communication, the set of instructions comprising:

one or more instructions that, when executed by one or more processors of a user equipment (UE), cause the UE to:
  transmit a first random access channel (RACH) message to a network entity; and
  monitor, absent downlink control information, for a second RACH message in a set of resource candidates based at least in part on the first RACH message.

32. A non-transitory computer-readable medium storing a set of instructions for wireless communication, the set of instructions comprising:
  one or more instructions that, when executed by one or more processors of a network entity, cause the network entity to:
    receive a first random access channel (RACH) message; and
    transmit, based at least in part on the first RACH message, a second RACH message in a set of resource candidates scheduled absent downlink control information.

* * * * *